(12) United States Patent
Maganas

(10) Patent No.: US 8,512,644 B1
(45) Date of Patent: *Aug. 20, 2013

(54) SYSTEM FOR TRANSFORMING ORGANIC WASTE MATERIALS INTO THERMAL ENERGY AND ELECTRIC POWER

(76) Inventor: Thomas C. Maganas, Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,543

(22) Filed: Aug. 1, 2012

(51) Int. Cl.
*B01J 8/00* (2006.01)

(52) U.S. Cl.
USPC ............ 422/186; 422/140; 422/146; 588/313

(58) Field of Classification Search
CPC ........................................................ B01J 8/00
USPC .................... 422/140, 146, 186; 588/313
See application file for complete search history.

(56) References Cited

U.S. PATENT DOCUMENTS

| | | |
|---|---|---|
| 2,956,865 A | 10/1960 | Williams, Sr. |
| 3,632,304 A | 1/1972 | Hardison |
| 3,714,071 A | 1/1973 | Michalko |
| 3,841,242 A | 10/1974 | Sigg |
| 3,915,890 A | 10/1975 | Soldate |
| 3,922,975 A | 12/1975 | Reese |
| 4,052,173 A | 10/1977 | Schultz |
| 4,308,806 A | 1/1982 | Uemura et al. |
| 4,330,513 A | 5/1982 | Hunter et al. |
| 4,497,637 A | 2/1985 | Purdy et al. |
| 4,623,400 A | 11/1986 | Japka et al. |
| 4,701,312 A | 10/1987 | Kice |
| 4,708,067 A | 11/1987 | Narisoko et al. |
| 4,724,776 A | 2/1988 | Foresto |
| 4,761,270 A | 8/1988 | Turchan |
| 4,886,001 A | 12/1989 | Chang et al. |
| 4,974,531 A | 12/1990 | Korenberg |
| 4,977,840 A | 12/1990 | Summers |
| 4,991,521 A | 2/1991 | Green et al. |
| 5,010,830 A | 4/1991 | Asuka et al. |
| 5,178,101 A | 1/1993 | Bell |
| 5,181,795 A | 1/1993 | Circeo, Jr. et al. |
| 5,207,734 A | 5/1993 | Day et al. |

(Continued)

FOREIGN PATENT DOCUMENTS

| | | |
|---|---|---|
| EP | 0176123 | 4/1986 |
| EP | 0605719 | 7/1994 |

(Continued)

OTHER PUBLICATIONS

Biozone Scientific, Hydroxyls: Powerful air Purification, www.extrapureair.com, pp. 1-3 (Jun. 19, 2002).

(Continued)

*Primary Examiner* — Nina Bhat
(74) *Attorney, Agent, or Firm* — Workman Nydegger

(57) ABSTRACT

A power generation system for converting organic material into thermal energy and electric power. A reaction of organic material with supercritical water, —OH radicals, and muon methyl radicals are released from a catalytic bed of silica particles in suspended initially transform the organic material into thermal energy. A Nano monomolecular film located on an interior surface of the reaction chamber interacts with plasma formed by conversion of the organic material into thermal energy to produce ion plasma electromagnetic energy. One or more magnetic-coil generators positioned adjacent to the reaction chamber interacts with the electromagnetic energy to produce electric power.

15 Claims, 10 Drawing Sheets

(56) References Cited

U.S. PATENT DOCUMENTS

| | | | |
|---|---|---|---|
| 5,335,609 | A | 8/1994 | Nelson et al. |
| 5,347,936 | A | 9/1994 | Thorhuus |
| 5,676,070 | A | 10/1997 | Maganas et al. |
| 5,928,618 | A | 7/1999 | Maganas et al. |
| 6,235,247 | B1 | 5/2001 | Maganas et al. |
| 6,520,287 | B2 | 2/2003 | Maganas et al. |
| 6,962,681 | B2 | 11/2005 | Maganas et al. |
| 8,283,512 | B1 * | 10/2012 | Maganas ................. 588/313 |
| 2005/0211143 | A1 | 9/2005 | May et al. |

FOREIGN PATENT DOCUMENTS

| | | |
|---|---|---|
| FR | 2687765 | 2/1992 |
| FR | 2701223 | 8/1994 |
| GB | 541962 | 12/1941 |
| JP | 55-24597 | 7/1979 |
| JP | 358095192 | 6/1983 |
| JP | 5-115752 | 2/1992 |
| WO | WO9324207 | 12/1993 |

OTHER PUBLICATIONS

Combustion Research Facility News, *Raman probe validates oxidation model in supercritical water*, Sandia National Laboratories, vol. 17, No. 5 (Sep./Oct. 1995).

Hydroxyl Radical Source, The Hydroxyl Radical; Sources and Measurement, www.chem.leeds.ac.uk, p. 1 of 2, (Jun. 24, 2002).

Marrone, Philip A., Supercritical Water Oxidation, web.mit-.edu, p. 1 of 1, (Jun. 24, 2002).

Scientific American, Paving Out Pollution, 2 pgs., www.s-ciam.com (Jun. 24, 2002).

Shafey et al., Experimental Sudy on a Bench-Scale, Batch-Type Fluidized-Bed Combustor for Energy Production From Waste-Derived Fuels, 331-338, Energy, vol. 17, No. 4 (1992).

U.S. Appl. No. 09/257,458, Aug. 30, 2000, Non-Final Office Action.
U.S. Appl. No. 13/253,804, Feb. 27, 2012, Non-Final Office Action.
U.S. Appl. No. 13/253,804, Jun. 12, 2012, Notice of Allowance.

* cited by examiner

SYSTEM FOR TRANSFORMING ORGANIC WASTE MATERIALS INTO THERMAL ENERGY AND ELECTRIC POWER

CROSS-REFERENCE TO RELATED APPLICATION

None.

BACKGROUND OF THE INVENTION

1. Field of the Invention

The invention is in the field of transforming organic materials, such as organic fossil fuels, coal, biomass, medical waste, municipal organic waste, and other organic wastes into new super fuel that generates heat and electrical energy with near zero carbon or ash emissions.

2. Review of Technology

Conventional electric energy production from organic materials typically relies on combustion of such materials into their combustion products and the cogeneration of heat, which is used to boil water that drives a turbine. The turbine, in turn, drives an electric generator for producing electric power. Electric energy can also be provided by fuel cells, which convert simple organic molecules into $CO_2$ and water. The oxidation-reduction reaction concomitantly provides electrical power that can be used for a desired purpose. In most cases, conventional combustion of organic materials creates significant pollutants, which are emitted into the atmosphere.

In answer to the need to reduce emissions and more efficiently extract heat energy from organic materials, recently developed was a reactor system for efficiently transforming organic materials, such as organic waste, medical waste, coal, fossil fuels, and biomass, into a new super fuel with high thermal energy with close to zero emission of CO, carbon or coal ash pollutants. Such system is described in U.S. application Ser. No. 13/253,804, filed Oct. 5, 2011, and U.S. application Ser. No. 13/290,069, filed Nov. 5, 2011, the disclosures of which are incorporated herein by reference. As disclosed in the foregoing applications by the inventor, the disclosed reactor does not burn organic materials as in conventional burners but rather transforms converts them into a new super power intermediate fuel, which is then converted into high thermal energy. The foregoing applications also describe the use of heat exchangers for extracting the thermal energy for other purposes, such as to power an electric generator.

BRIEF SUMMARY OF THE INVENTION

The present invention relates to methods and systems for transforming organic waste, medical waste, coal, fossil fuels, biomass, and other organic materials into electric power and thermal energy. The disclosed methods and systems include a reactor having a Nano monomolecular film deposited on the inner surface of the reactor during conversion of organic material into thermal energy. This Nano monomolecular film generates a reactive electromagnetic field that combines with OH radicals and Muon methyl radical to produce OHHO to efficiently crack or break cellulose bonds that release 17 inorganic elements that destroy formation of 23 carbon chains, to produce Complete Combustion with zero toxic atmospheric emission. The single emission is supercritical water as gaseous material and heat to convert organic material in the reactor into a new fuel that is then consumed and forms an ion plasma at the base within the reactor. One or more magnet-coils are positioned within and adjacent to the reaction chamber to conduct electrons directly produced by electromagnetic field created by the ion plasma reaction. The production of approximately 5 megavolts was verified, using a volt meter attached to the positive and negative electrodes of the coil surrounding the conductor system of coils and magnets. This direct flow of electricity continues as long as fuel is present. A heat exchanger can also transfer thermal energy from the ion plasma reaction to a standard electrical generation unit.

The disclosed process also eliminates essentially 100% of all organic waste, medical waste, toxic waste, polymeric materials such as PVC (polyvinyl chloride) plastics, and efficiently transforms the organic waste into a new super intermediate fuel, which generates temperature to induce OHHO reactions to produce electromagnetic field, electricity from friction, and thermal energy because of complete combustion and zero organic emissions, which eliminates the organic materials with no significant emissions. The disclosed process initially transforms organic materials into a new intermediate type of high powered gaseous fuel that is completely consumed and converted into electricity and thermal energy, while eliminating emissions. It does this by more efficiently cracking cellulosic and protein molecular bonds found in organic matter and producing the new intermediate fuel, which then converted into thermal energy and electric energy as disclosed herein.

The reaction chamber includes a bed of catalytic silica particles that, in the presence of heat energy and the organic material, produces highly reactive hydroxyl radicals through a process that involves intermediate formation of muon methyl radicals. To begin the process, the reactor is initially heated with natural gas which is transformed into a new fuel by the disclosed process and raises its combustion temperature within 20 seconds to 540° C. As the temperature in the reactor rises, OH radicals reacting with Muon methyl radicals and other materials in the catalytic media react with the electromagnetic field and continue to transform the natural gas, which allows it to reach temperatures of 700° C. Thereafter, the organic material is placed into the reaction chamber and positioned above the bed of catalytic particles supporting a plasma. The temperatures in the reaction chamber drop briefly then recover within about 4 minutes. Once the desired temperature is reached, the natural gas supply is cut off. The heat combines with the OH radicals and muons, and the electromagnetic field to transform the organic waste introduced into the reaction chamber into a new superfuel that produces a plasma reaction that reaches over 1200° C. The reaction can last more than 40 minutes. The weight of the organic waste is reduced by 80% during the reaction. The remaining material is inert, sterile, and inorganic. The Maganas plasma surface reaches over 1200° C., yet three inches below the plasma, the exterior of the combustion chamber remains at room temperature for 45 minutes then increases to 540° C. This additional thermal energy can be transferred by a heat exchanger to a traditional electrical generator.

From there on, the reaction is self-sustaining and the organic material is efficiently converted into electricity and thermal energy with virtually no emissions. Inside the reactor, the ion plasma produces electromagnetic energy. The magnet-coil conductors transport the electricity from the reaction chamber to wires for collection and distribution.

Depending on the organic material load, temperatures above 540° C. can be maintained for about 60 minutes. When the temperature drops, that is an indication that the fuel has been consumed. The process consumes 100% of organic waste with virtually no emissions and typically leaving about 20% incombustible inorganic matter as a byproduct.

The Nano monomolecular film is comprised of dwarfed aligned molecules of carbon having dimensions of 30 angstroms by 50 angstroms, which elongate to 70 angstroms at high pressure. The individual molecules having alternating positive and negative zones. Though highly thermally insulating, the monomolecular film also helps to produce the ion plasma electromagnetic energy field within the reactor and adjacent to the reactor body. The Nano monomolecular film can also behave as a semiconductor.

Electric power produced by the reactor system can be conducted to an electric grid for distribution and/or a capacitor for transfer to a battery or other electrical storage devices.

These and other embodiments and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
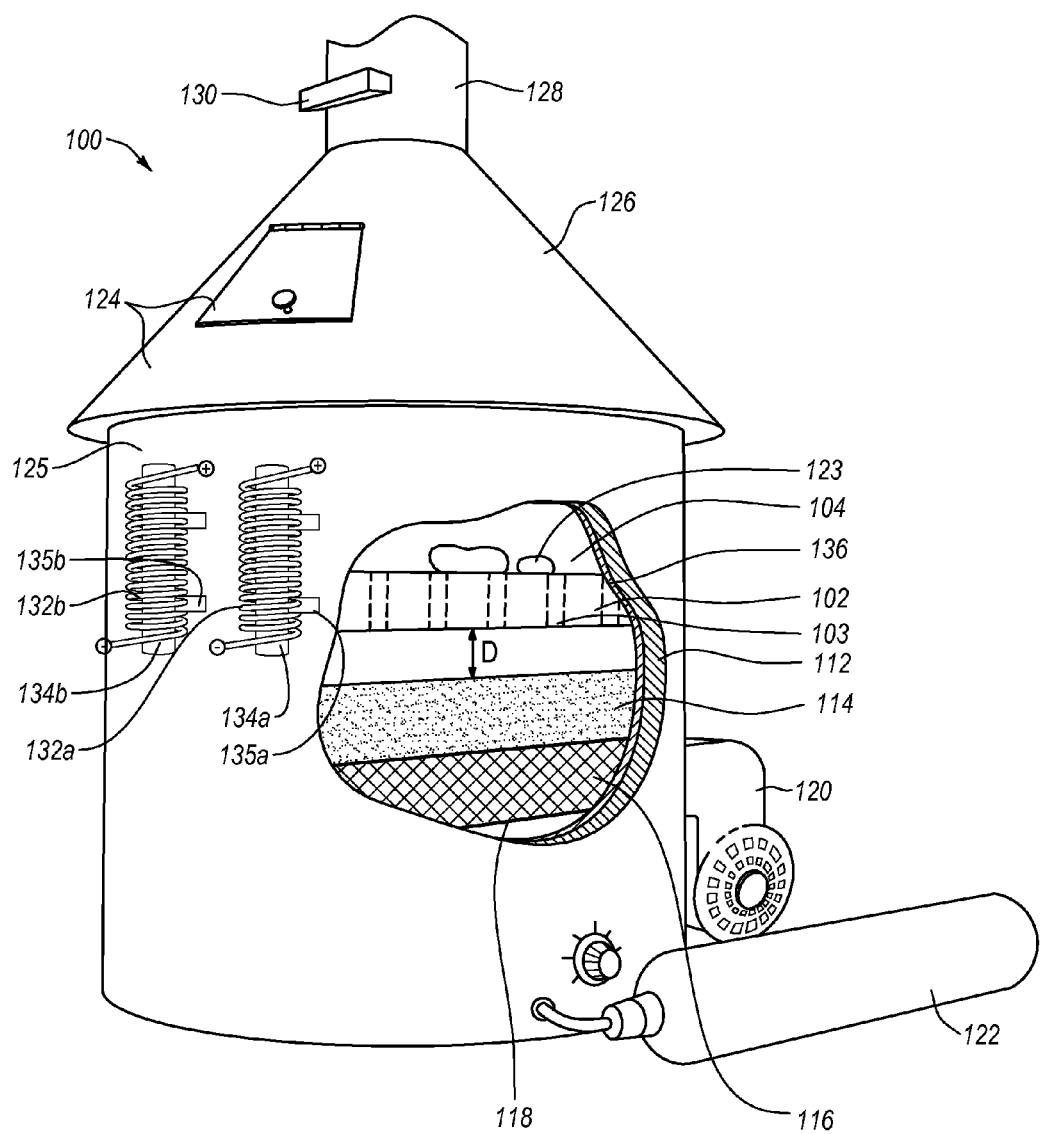
FIG. 1 is a perspective view of an embodiment of a reactor in which organic material is transformed into ion plasma electromagnetic energy used to produce electric power by magnet-coil generators.

Generally, the present invention relates to methods and systems for conversion of organic materials, such as organic fuels and biological waste, into electricity and thermal energy which, in turn, is converted to electrical power. The methods and systems can produce thermal energy and electrical power while destroying organic materials. In the case of biological waste, another benefit is the ability to disinfect and completely destroy pathogens.

The disclosed methods and systems involve transformation of organic waste to a new super fuel. Low grade heating gas that does not provide heat exceeding 500° F. over a 10 minute period was transformed to repeatably heat the reactor to 540° C. within 20 seconds. Then, within several minutes, temperature reaches 680+° C. plus meaning the cheap gas was converted into a new fuel capable of producing higher temperature. Cow bones, plastics, and other organic wastes that current take up dump space can be transformed into a super fuel that produces temperatures of 1200+° C. The same technology accomplished similar reactions and results in diesel engines and diesel fuel. The Nano monomolecular film was deposited within the piston chambers that produced Complete Combustion™ with virtually zero emissions. This transformation reduced CO emissions from 4000 ppm to 40 ppm and virtually zero hydrocarbons and CO.

In addition, the generation of electrons at the center of the reaction chamber is the result of formation of a plasma 12 inches below center and a temperature drop of 450° F. between two thermocouples—the different is friction—one at the top of the plasma and the second thermocouple at the reactor center—demonstrate the effects. A reaction chamber having a steel wall 3/16 inch thick received twice the temperature at the center, in which electrons are producing friction, generating electricity and almost zero heat transfer. Observation of the reactor, as seen in a video posted at Maganas.com show that the electrons are rotating right to left at a high speed producing friction and electrons with very little heat transfer. A new device that measures electron output showed plumes of electrons emitting from electromagnetic fields, i.e. about 50% more electrons racing out of the steel table top compared to previous electron calculations.

The reactor reduced 15 lbs. of hard Pennsylvania coal by 80% without damaging the coal inorganic layered shell with constant temperature of 570° C. over a period of 90 minutes before running out of transformed super fuel without a smell, ash particles, and no organic carbon emissions. OH (hydroxyl) radicals join Muon methyl radicles to form OHHO with precision reaction time of 2.2 mille seconds, and other reactive hydrogen radicals that efficiently break organic cellulose bonds. Super critical water as a gas is a part of 17 inorganic substances identified and weighed at 1,454.32 ppm and other elements on loss on ignition (sulfate ash). The hydroxyl radicals transform twenty three carbon chains to a new super fuel producing precisely weighed at 1,454.32 ppm. Complete Combustion™ means there is zero output from exhaust with temperature of 110° F. whereas normal exhaust temperature is 800° F.

The present invention utilizes a catalytic media, such as silica or alumina, to generate highly reactive hydroxyl radicals, supercritical water, muons and other reactive species in the presence of an organic material heated to efficiently convert the organic material into thermal energy. A Nano monomolecular film formed on the interior surface of the reactor interacts with ions produced during conversion of the organic materials into thermal energy to form ion plasma electromagnetic energy within and adjacent to the reactor.

The Nano monomolecular film includes alternating positive and negative regions having dimensions of 30 angstroms by 50 angstroms and that elongate to 70 angstroms at high pressure and other conditions. In addition, the dwarfed (Nano) particle has four magnetic locks +−+− in order to lock each adjoining Nano particle one to the other. The Nano monomolecular film has surpassed the chip industry's desires, which are heat transform, friction, and to expand use space and is ready for any additional requirement. The film can be deposited on any surface and withstand temperatures well over 1200° C. and high friction with no damage. The film can increase semiconductor chip speed and eliminate dangerous gases such as gallium.

Figure 6A:
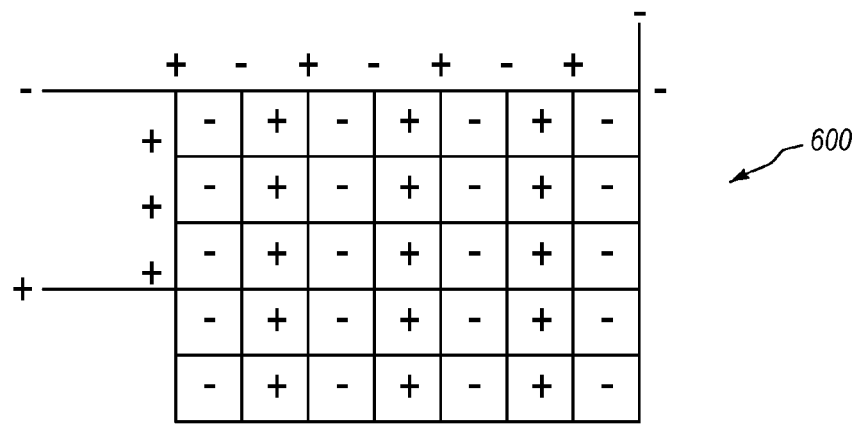
FIGS. 6A-6B illustrate individual nanoparticles comprising the Nano monomolecular film with alternating polarity.
Figure 6B:
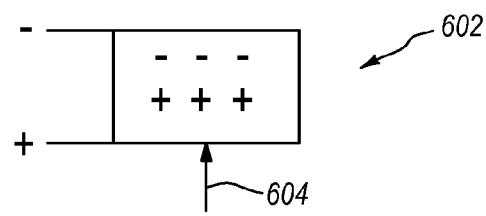

As illustrated in FIG. 6A, individual particles or regions of the Nano monomolecular film 600 have alternating polarity. Positive, negative and grounding electrodes can engage the Nano monomolecular film 600 in order to localize and/or alter the polarity using electrical energy. FIG. 6B shows a nanoparticle 602 having polarity in different regions with positive and negative electrodes schematically attached thereto together with a common ground 604.

Figure 7:
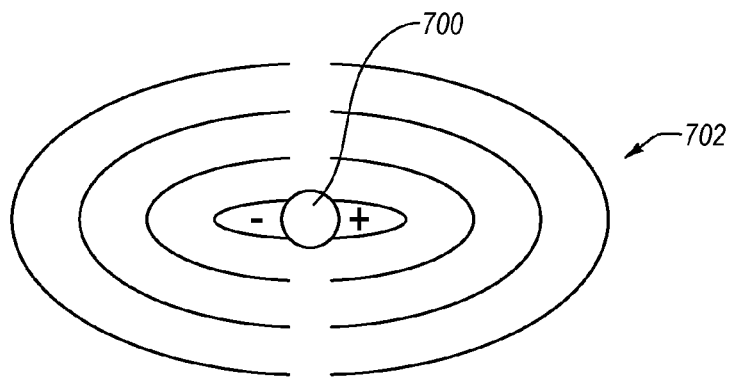
FIG. 7 illustrates the polarity of an individual nanoparticle comprising the Nano monomolecular film with an induced electromagnetic field surrounding the nanoparticle.
Figure 3B:
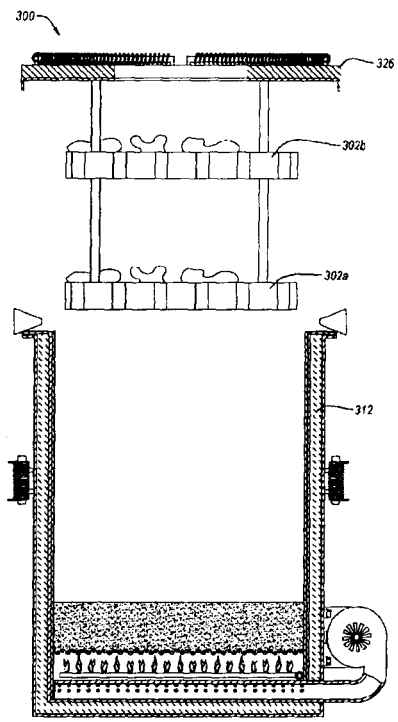
Figure 3C:
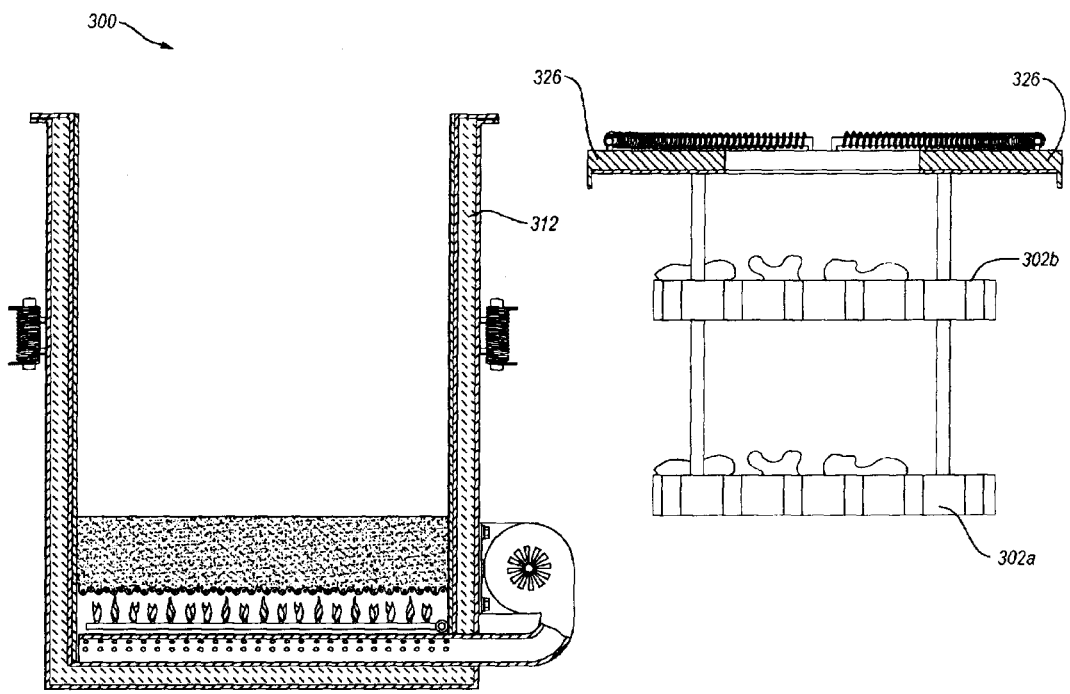

As illustrated in FIG. 7, an individual nanoparticle 700 with polarity is schematically shown with an induced electromagnetic field 702 surrounding the nanoparticle 700, as occurs within a reactor in which a plasma has been generated.

There has been no single problem within the Nano monomolecular film chamber or its conversion to electromagnetic field in the last two years, including instances of well over 1200° C. temperatures or its friction with zero damage within the chamber. There was electron damage outside machine switch coils, fuses, and our fuse box that knocked off four 30 amp fuses. The electrons did penetrate and explode the 3/16 stainless steel machine table top that demonstrates that a huge amount of uncounted electrons are being released.

The size within the experimental reaction chamber is 16 inches by 30 inches and is deposited with billons of Nano particles, which are magnetically locked into a Nano monomolecular film. Igniting a cold start of natural gas as a fuel, and a silica base above ignition chamber, provided an instant increase in temperature to release OH radicals simultaneously with Muon methyl radicals and OHHO to establish an electromagnetic field with a plasma within mille seconds, and to produce 540° C. temperatures all within 20 seconds of the cold start.

From these results, the Nano monomolecular film appears to be a superior semiconductor material (e.g., for making chips). The problem with today's gallium arsenide quantum dot chip of 465 atoms is that it is curved and the signals are at the limit as was publicized. Nano composites of known carbon typically matter crack due to oxides, and other contaminates. The Nano particles herein are magnetically locked without so called Nano wire.

In general, crystal structures can be divided into 32 crystal classes, according to the number of rotational axes and reflection planes they exhibit. Only 10 of the 32 point groups are polar. All polar crystals are pyroelectric, so the 10 polar crystal classes are sometimes referred to as the pyroelectric classes. The property of pyroelectricity is the measured change in net polarization (a vector) proportional to a change in temperature. The total pyroelectric coefficient measured at constant stress is the sum of the pyroelectric coefficients at constant strain (primary pyroelectric effect) and the piezoelectric contribution from thermal expansion (secondary pyroelectric effect). Under normal circumstances, even polar materials do not display a net dipole moment. Polar crystals only reveal their nature when perturbed in some fashion that momentarily upsets the balance with the compensating surface charge.

Progress has been made in creating artificial pyroelectric materials, usually in the form of a thin film, out of gallium nitride (GaN), caesium nitrate ($CsNO_3$), polyvinyl fluorides, derivatives of phenylpyrazine, and cobalt phthalocyanine. Lithium tantalate ($LiTaO_3$) is a crystal exhibiting both piezoelectric and pyroelectric properties, which has been used to create small-scale nuclear fusion. The system of the current invention utilizes a single layer of a monomolecular nano film consisting of aligned carbon molecules having dimensions of 30 angstroms by 50 angstroms and that elongate to 70 angstroms at high pressure. The elongation and contraction of the nanofilm during the conversion reaction correlates to elongation and contraction of a dipole moment that assists in generation of the electromagnetic field inside and adjacent to the reactor.

The term "magnet-coil generator" refers to a coil of electrically conductive wire wrapped around an elongated core comprised of a magnet and a protective sleeve. In the context of this invention, the "magnet-coil generator" produces an electric potential as a result of interaction with the electromagnetic energy produced in the reactor during conversion of the organic material.

The terms "activate" and "activated" are meant to refer to a condition in which the catalytic media (e.g., silica and/or alumina particles) are able to produce a "reactive atmosphere" of hydroxyl radicals and other reactive species capable of degrading and extracting heat energy from organic material.

The terms "biological waste," "medical waste," "animal tissue," or "human tissue" are meant to refer to any biological, microbe, animal or human tissue or cells, or biological components thereof. Such materials typically comprise protein, fat, blood, and bone mass. Because blood is mostly water, biological waste is difficult to burn using conventional combustion methods.

The term "reactive atmosphere" is meant to refer to the condition within the reaction chamber, and possibly surrounding areas and conduits, that include a localized concentration of highly reactive hydroxyl radicals, supercritical water, muons and/or other reactive molecular fragments, free radicals or species capable of converting organic materials into thermal energy.

The terms "carbon-containing fuel," "organic fuel material," or "biological materials" are meant to refer to any organic material that generate and/or release energy when combusted or burned, usually in the form of heat, light or a combination thereof. The term "fossil fuel" is a subset of "carbon-containing fuel" and includes coal, oil, natural gas, derivatives of coal, natural gas and oil, and the like. Non-fossil organic fuels include alcohols, fuels derived from alcohols or other fermentation products, wood, biomass and the like.

The term "reaction chamber" shall be broadly construed to include any apparatus capable of holding therein a catalytic media, such as silica and/or alumina, and that provides appropriate conditions that result in formation of the reactive atmosphere for degrading and converting organic materials into thermal energy.

The terms "degrade" or "degradation" refer to processes by which organic materials are at least partially broken down or eliminated to yield lesser organic substances. It includes complete combustion of gases into carbon dioxide, water and other clean reaction products. It also includes any reaction in which CO, $CO_2$, carbon or hydrocarbons are converted into other, less polluting forms of carbon or other substances.

The term "suspended" is meant to indicate that at least a portion of the catalytic particles are slightly elevated and/or separated by rising gases such that they are not at rest in a state of natural particle packing density. Suspending the particles leaves them in a less compacted state. This suspended or separated elevated state yields particles with surfaces that are more accessible and available for contact with diffused heated gases rising through the particles within the reaction chamber. Increased surface contact with diffused heated gases increases the ability of the catalytic particles to generate the reactive degrading atmosphere. Failure to partially separate the particles results in less efficient and uniform conversion of organic material into heat energy.

The term "operating temperature" is meant to refer to the temperature at which hydroxyl radicals, supercritical water, muons and/or other free radicals or reactive substances, molecular fragments or reactive species capable of degrading and converting organic materials into thermal energy are generated by a catalytic media such as silica and/or alumina.

The term "portable" is meant to refer to the ability of the devices and systems used to carry out the methods of the present invention, as embodied in certain embodiments, to be capable of being moved throughout a building or medical or research facility or industrial site or energy plant or wherever needed. This movement of the device or system might be by simply carrying, wheeling by means of a supporting stand equipped with rollers or wheels, or moving by means of moving equipment (e.g., a forklift or small crane), the important feature being that a portable device or system is not primarily a fixture as the term is commonly understood.

II. Device and System

A. Operating Parameters

The inventive system was tested using cow leg bones, pork hearts, and neck bones with meat, as well as toxic PVC plastic pipes (e.g., 4 feet of 2 inch PVC pipe) which normally produce deadly fumes when heated or burned. Coal of various forms was also converted into thermal energy using the disclosed apparatus and methods. The inventive reactor reduced the PVC to three ounces of white and black particles with zero odors within 30 minutes. Another test was performed using 30 lbs. of 3×2 inch cow leg bones with a weight loose of 80%. One previously reacted bone dropped accidentally from a work table and crumbled. These tests have been repeated with similar results each time.

The emission tests recorded a $CO_2$ (carbon dioxide) reading of initially 4%. Emissions were gradually reduced to zero by the end of the test run. The initial HC (hydrocarbon) and CO (carbon monoxide) emissions of 40 ppm were reduced to 4 ppm (parts per million). By comparison, combustion of diesel oil normally yields 3000 ppm of CO and 15% $CO_2$ and incomplete combustion. The 80-90% reduction in weight with extremely low emissions provides evidence that the biomass was efficiently used as fuel with increased energy.

According to one embodiment, the inventive process uses natural gas to reach an initial temperature of 540° C. within 20 seconds from a cold start and air injected into the reactor to start reactions involving the organic material and the catalytic media particles in the reaction chamber. Natural gas flow is cut off when a temperature of 540° C. is reached but heat production continues with the organic material producing increased temperature without producing a flame. The continuing reactions transform the waste into thermal energy and reduce bone weight by 80% to 90% and the PVC plastic weight is reduced by over 95%. 50 pages of paper were also converted and their weight was reduced by over 85%. The paper showed no signs of actually burning and produced no emissions and the print remained visible but when touched the paper broke like snowflakes.

The initial Maganas Plasma Process™ was pioneered by Thomas C. Maganas and Allen Harrington, and a nano molecule that formed a monomolecular film discovered in Chemical Vapor Deposition (CVD) led to the discovery of a diesel catalytic converter. The monomolecular nano film includes elongated dwarf shaped carbon molecules with a precise size, and shape which was 30 Å (angstroms) by 50 Å. Increased pressure increased its size to 70 Å with resistance to cracking, while other nanomolecules crack merely by a touch. Maganas and Harrington filed a U.S. patent in 1991 and won a patent in 1992 for the film. Johannes Gutenberg University in Mainz, Germany claimed discovery and identified the identical Maganas monomolecular nano film with their advanced electron microscope that matched our nanomaterial as to size, shape, and its resistance to 400,000 atmospheres of pressure before cracking. Their photos fully matched our nanomaterial that formed the monomolecular film, which is an important aspect in reduction of diesel emissions and organic waste and reduce emissions by 99.995%. Maganas has been awarded 12 patents by the United States Patent and Trademark Office and has other patents pending. We have additional foreign patents, and have invested several millions of dollars into the Research and Development of these new technologies prompted by the Maganas and Harrington discovery of —OH radicals and the nano formation of monomolecular film.

A fully developed and functional prototype system is now operating at the Maganas Laboratories. Located in Carson, Calif., this first generation system was developed to serve as the functional proof of concept of the technology exhibiting the following highlights:

1. Conversion of low energy grade cow bones, soft body tissue, plastics, and many other forms of organic matter into sustained temperatures of 420° C.-600° C. without flames with about 5% of the fuel that normally would be required;
2. Demonstrated ability to convert paper and PVC plastic into sustained temperatures of 500° C.-700° C. in the absence of combustion and with a 90% reduction of mass weight and 99.995% emission reduction with zero odors throughout the test during transformation, and the particles that is left over on completion.

The Maganas Plasma Process™ is based upon inducing ion plasma to form and to allow hydroxyl radical reactions in a reactor coated with a Nano monomolecular film with an open top that allows atmosphere penetration without affecting the process.

The Tom Maganas process of eliminating diesel engine emissions with a hydrocarbon diesel catalytic converter eliminates 99.995% of all emissions from diesel engines with a ⅔ reduction in fuel consumption and an increase of power. The two key elements of the Maganas catalytic converter is hydroxyl radicals, and the monomolecular nano film, which together produce reactions to crack 17 inorganic elements found in diesel fuel that equaled 1,451 ppm (parts per million), and also reduced sulfur to a sulfate ash element that could not be weighed by the analyzing scientist. This also permanently deposited the Nano monomolecular film onto the interior surface of the reactor. Diesel fuel being injected into compression with —OH radicals and monomolecular nano film reactions that crack 1,451 ppm of the inorganic elements from diesel to form a fuel to increase power and decrease fuel consumption by ⅔ occur by breaking the carbon chains and releasing supercritical water as a gas by separating inorganic elements. One would have to conclude that the standard ⅔ drop in fuel emissions means they are consumed as fuel and match Maganas Plasma transformation organic of medical waste.

Surprisingly and unexpectedly, the Nano monomolecular film has been found to display other properties, including the ability to interact with the thermal energy produced during conversion of organic material to produce an ion plasma electromagnetic field. The magnetic-coil conductors positioned within and adjacent to the reactor transport the electricity generated by the plasma reaction on wires for collection and distribution.

B. Structures and Methods

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. The features of the embodiments and figures described and shown herein can be used and combined with other features of other embodiments as well as figures. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates an embodiment of a reactor system 100 for efficient conversion of organic material 123 into thermal energy and electric power. The reactor system 100 include a reaction chamber 112 containing a heat generation source 122 (e.g., a gas flame or electrical heating element), an air flow source 120, a base support 118, an airflow diffuser 116, a catalytic media 114, and an elevated support element 102 configured for supporting organic material 123 at a distance (D) above the catalytic media 114. The elevated support element 102 includes a support surface with one or more apertures 103 that permit gases to pass therethrough and deliver reactive species produced by the catalytic media to the organic material 123. The reaction chamber 112 can include a void space 104 between the elevated support element 102 and a top filter 130 and/or an exhaust conduit 128. The depth of catalytic media 114 need only be sufficient to produce a reactive atmosphere of reactive hydroxyl radicals or other reactive species and can be as little as 1 inch and as high as 1 foot, with about 2-7 inches being preferred, and about 2-5 inches being most preferred.

The positioning of the elevated support element 102 above the catalytic media 114 at a distance D allows for the reaction chamber 112 to be capable of facilitating complete degradation and conversion of organic materials (e.g., organic fuels and biological waste) into thermal energy. Additionally, the elevated support element 102 keeps the organic material 123 from falling into the catalytic media 114. The reaction chamber 112 is generally enclosed or sealed except for where air is introduced into the bottom of the reaction chamber 112 to suspend or separate the catalytic media 114. Additionally, the reaction chamber 112 can include an inlet 124 so that the organic material 123, alone or contained by the elevated support element 102, can be introduced into the reaction chamber 112. Also, the reaction chamber 112 includes exhaust conduit 128 so that resulting gases and/or heat can be removed.

The catalytic media 114 can include sand-like particles of a material such as silica sand, silica gel, hydroxylbastnasite, alumina, other OH radical generating materials known in the art or which may be developed, and the like. Silica sand, silica gel, alumina, and mixtures thereof are preferred media because of their low cost and exceptional performance in the reaction chamber 112. The catalytic particles can have an average size (e.g., diameter or cross-sectional dimension) ranging from about 0.1 mm to about 1 cm, more preferably from about 0.2 mm to about 5 mm, and most preferably from about 0.5 mm to about 2.5 mm.

The catalytic media 114 can consist essentially of silica, alumina, or mixtures thereof. The term "consist essentially of" should be understood to mean that the catalytic media 114 can be particles that mainly consist of silica, alumina or mixtures thereof, but they may include minor quantities of impurities such as metals and ash typically found in silica and/or alumina. It is believed that the silica and/or alumina, when properly activated in the presence of sufficient heat and moisture, produce a localized reactive atmosphere of highly reactive hydroxyl radicals, muons and/or other reactive species or molecular fragments, which are able to degrade and convert organic materials into heat energy.

Moreover, whereas the silica and/or alumina are believed to be responsible for the formation of a reactive atmosphere that includes abundant hydroxyl radicals such that expensive catalysts such as palladium and platinum are not necessary, inclusion of such materials in minor amounts would be within the scope of the present invention so long as the silica and/or alumina are activated and able to produce the reactive atmosphere.

It may be advantageous to select catalytic particles that have a relatively high specific surface area. The high specific surface area can be achieved by particle size distribution as well as porosity of the particles. It is believed that it is at the surface of the catalytic particles where the reactive hydroxyl radicals or other reactive species or molecular fragments are generated. Accordingly, increasing the surface area of the catalytic particles without increasing their weight allows for the use of a lower mass of particles while maintaining a desired level of reactivity with the organic material. Reduced weight is particularly desirable in the present embodiment, since the reaction chamber 112 can be configured to be portable. The amount of particles needed may be significantly reduced when the grain size is reduced and/or the surface of the particles is made to be more irregular, both of which tend to increase the specific surface area of the catalytic particles.

The catalytic media 114 is shown to be positioned above an air diffuser 116 which sits upon a base support 118. Optionally, the air diffuser 116 and base support 118 can be combined into a single element that function to both 1) support the catalytic media at a desired location within the reaction chamber 112 and 2) diffuse air passed through the reaction chamber 112 so that the airflow is sufficiently diffuse to substantially uniformly suspend or separate the catalytic media 114.

In one example, the air diffuser 116 can be a bed of pebbles, rocks or particles that are substantially larger than the catalytic media 114. The airflow rates for suspending the catalytic media will generally depend on the size of the reaction chamber and/or the quantity of organic material being converted. According to one embodiment, the airflow rate can range from about 1 $ft^3$/min to about 500 $ft^3$/min, more preferably from about 5 ft³/min to about 250 ft³/min, and most preferably from about 10 ft³/min to about 100 ft³/min.

The air diffuser 116 can be configured to efficiently transfer heat with respect to the airflow throughout the catalytic media 114 and reaction chamber 112. When the air diffuser 116 includes rocks, they can sit atop a support plate that functions as the base support 118. On the other hand, the air diffuser 116 can be a support plate that has a sufficient amount and distribution of apertures that diffuse the air passed therethrough. The air source 120 can be oriented with respect to the air diffuser 116 and/or base support so that air introduced through the air diffuser 116 can travel upward through the catalytic media 114 and not downward and away from the catalytic media 114. The base support 118 (e.g., support plate) can include a heat conductive material (e.g., metal) for effective heat transfer when heat is used to regulate the temperature of the reaction chamber 112.

An air source 120 blows forced air through the catalytic media 114 to a partially suspend and/or churn the catalytic media 114. An example of an air source 120 can include air jets from an air compressor. The air jets can be located below or within the air diffuser 116 to facilitate a more disperse airflow through the catalytic media 114. However, the air jets can be situated directly within the catalytic media 114, typically in embodiments where an air diffuser 116 is not employed. Also, the air jets can be located below a base support 118 that has apertures that can diffuse the airflow.

The air introduced into the reaction chamber 112 by the air source 120 can be heated to a desirable temperature. For example, the airflow from air jets may be preheated to approximately the desired temperature of the reaction chamber 112, or it may become heated by means of heat that radiates through the base support 118 and/or air diffuser 116. Also, a heat generation source 122 can be provided in an orientation that provides a flame or electrical heating element as a means for heating the base support 118 and/or air diffuser 116. The heat generation source 122 may include one or more burners that burn a carbon fuel source. Also, the heat generation source 122 can be an electric resistive heater or any other device that can transfer heat to the base support 118, air diffuser 116, catalytic media 114, or airflow from the air source 120.

In the instance where heated air is introduced into the reaction chamber 112 (e.g., by air jets), the air may be preheated by a number of means, including electric heating means or radiant heating means heated by a fuel such as natural gas, fuel oil, or coal, where it is desired to pass pure air through the reaction chamber 112. However, it may be more economical to simply introduce and burn natural gas within the reaction chamber 112 (e.g., within the catalytic media 114). Because natural gas produces mainly water and carbon dioxide, it should not inhibit the reaction process within the reaction chamber 112. Generation of water vapor from natural gas may enhance the reactivity of the catalytic media 114 through production of hydroxyl radicals. Other combustion gases besides natural gas can be used. Because the combustion gases are preferably blended with introduced airflow in order to provide the proper temperature conditions, the air that is introduced into the reaction chamber 112 can include adequate oxygen in most cases. However, it is possible to enrich the air with pure oxygen if desired to increase the reactivity within the reaction chamber 112.

The airflow through the catalytic media 114 should have sufficient velocity and pressure to cause the catalytic media 114 to become partially suspended. In order to obtain the best and most efficient conversion of organic materials, it may be preferable to blow just enough air to cause adequate suspension of the media so that the elevated support element 102 holding an organic material 123 remains a distance (D) (e.g., at least 2 inches, preferably at least about 3 inches, more preferably at least about 5 inches, and most preferably at least about 8 inches) over the catalytic media 114 when suspended. Alternatively, the elevated support element 102 can be adjusted to a distance (D) from the top of the catalytic media 114 within the void space 104 in order to effect optimal conversion of the organic material 123. However, it should be considered that the less air that actually passes through the reaction chamber 112, while maintaining adequate suspension, will use less energy and produce a lower quantity of resulting gases that are vented from the reaction chamber 112.

The reactor system 100 can be equipped with means for introducing biological materials 123 into the reaction chamber 112, where the organic materials 123 can be packaged or loose on the elevated support element 102. The organic materials 123 can be introduced into the reaction chamber 112 while on the elevated support element 102, or they can be placed onto the elevated support element 102 already installed in the reaction chamber 112. Such a means can include an entrance 124 such as doors, ports, continuous inlets, or any other configuration that allows the organic materials 123 to be positioned on the elevated support element 102 in the reaction chamber 112 during conversion. The entrance 124 can be configured to be capable of quickly opening to receive the biological material 123, and then closing in order to retain the heat within the reaction chamber 112. In an alternative embodiment, the entrance 124 may include a set of double doors to better retain heat within the reaction chamber 112, with a first door opening to allow the introduction of the organic material within a pre-chamber (not shown), after which a second door opens up into the main reaction chamber 112.

In some instances, such as where very large pieces of organic material (e.g., corpses) are introduced into the reaction chamber 112, it might be preferable to open the reaction chamber 112 by removing a lid 126 covering the top of the reaction chamber 112. The lid 126 can be removed from the main body 125 of the reaction chamber 112.

The reactor 100 can include an exhaust conduit 128 positioned above the reaction chamber 112 so that produced gases can be released. Optionally, the exhaust conduit 128 can be located near the entrance 124 and/or the lid 126 at the top of the reaction chamber 112, which carries the gases to an appropriate location for emission into the outside air. Heat within the waste gases can also be recycled back into the reaction chamber 112 by any appropriate method known to those of ordinary skill in the art, such as by heat exchange, to heat up the air introduced into the reaction chamber 112, or by simply recirculating the gases back into the reaction chamber 112 to ensure complete and efficient breakdown of essentially all organic materials 123 and gases. This may be one means of ensuring the complete conversion and/or destruction of any biological materials, such as viruses or pathogenic agents. Organic materials 123, such as carbon fuels, medical waste, viruses, bacteria, and the like, all are converted to a new fuel resulting in complete combusting and destruction of all organic matter, viruses, and bacteria.

The system includes power generation means for producing electric power. One component of the power generation means is a Nano monomolecular film 136 positioned on an interior surface of the reaction chamber 112. This nanofilm 136 is deposited during initial use of the reactor to destroy organic material and thereafter helps to generate electromagnetic power in and adjacent to the reaction chamber 112. The nanofilm 136 is a single layer Nano monomolecular film consisting of aligned carbon molecules having dimensions of 30 angstroms by 50 angstroms and that elongate to 70 angstroms at high pressure resulting in substantial increase in temperature resistance, operating capabilities, and electromagnetic potential. The Nano monomolecular film interacts with plasma formed in the reaction chamber 112 to generate an ion plasma electromagnetic field, the existence of which can be verified by measuring an electric potential produced by magnet-coil generators 132, which comprise another component of the power generation means.

The magnet-coil generator 132 includes a magnetic core 134 positioned adjacent to an exterior surface of the reaction chamber 112 at a desired spaced-apart distance (e.g., about 0.5-5 inches, or about 1-4 inches, or about 1.5-3 inches). The magnet-coil generator 132 interacts with the electromagnetic field produced by the reactor system 100 to produce electric power.

An implementation of the power generation system includes one or more magnet-coil generators 132. The magnet-coil generators 132a, 132b shown in FIG. 1 can be coupled to the reactor body 125 by insulating fasteners 135a, 135b, such that the magnet-coil generators 132a, 132b are in close proximity to but electrically disconnected from the reactor body 125. The magnet-coil generators 132a, 132b may be connected in series to increase the voltage of electricity, or they may be connected in parallel to increase current without affecting the voltage. Alternatively, the system may include 4, 8, or more magnet-coil generators. In a preferred embodiment, the power generating system can generate 6-7 megawatts of electric power. Electric power produced by the reactor system 100 can be conducted to an electric grid for distribution and/or a capacitor for transfer to a battery or other electrical storage devices. Means for conducting electrical power known in the art, including wires, power transformers, power distribution systems, and the like can be used for this purpose.

In one embodiment, a method for efficiently converting organic materials into electric power can be performed by reactor system 100. The conversion method can be performed in a manner for enhancing energy production from carbon fuels, as well as for destroying both biological waste and animal or human corpses. According to one embodiment, the temperature within reaction chamber 112 can be maintained in a range from about 350° C. to about 600° C., more preferably at about 550° C. This temperature can be obtained at in the void space 104, such as at the elevated support element 102 at a distance (D) above the catalytic media 114. This temperature can be initially achieved by the heat generation source 120 and/or air source 122. The heat generation source 120 can be extinguished and/or reduced in heat production once the organic material 123 begins to convert and produce heat energy, and the air source 122 flow rate can be adjusted so that the conversion of the organic material 123 to heat energy is maintained. The conversion of the organic material 123 can be maintained even when the heat generation source 120 is deactivated.

The inventor has found that organic materials 123, such as carbon fuels, medical wastes, corpses, and other organic wastes, are efficiently converted by means of reactive species produced by the catalytic media 114, which include reactive hydroxyl radicals, hydrogen oxides, muons, or other highly oxidative species. Because of the oxidative nature of the process for converting organic materials into heat energy, it may be preferable to ensure that there is abundant oxygen within the air being introduced into the reaction chamber 112.

In some cases it might be desirable to adjust the composition of the atmosphere within the reaction chamber 112. For example, it may be desirable to increase the amount of oxygen within the reaction chamber 112 by intermittently injecting oxygen in order to facilitate oxidation of a particular biological material. Most organic wastes naturally contain water, which can yield additional hydroxyl radicals during the process. Supplemental gas may be introduced together with the air by means of the air source 120 or other gaseous inlet.

Figure 2A:
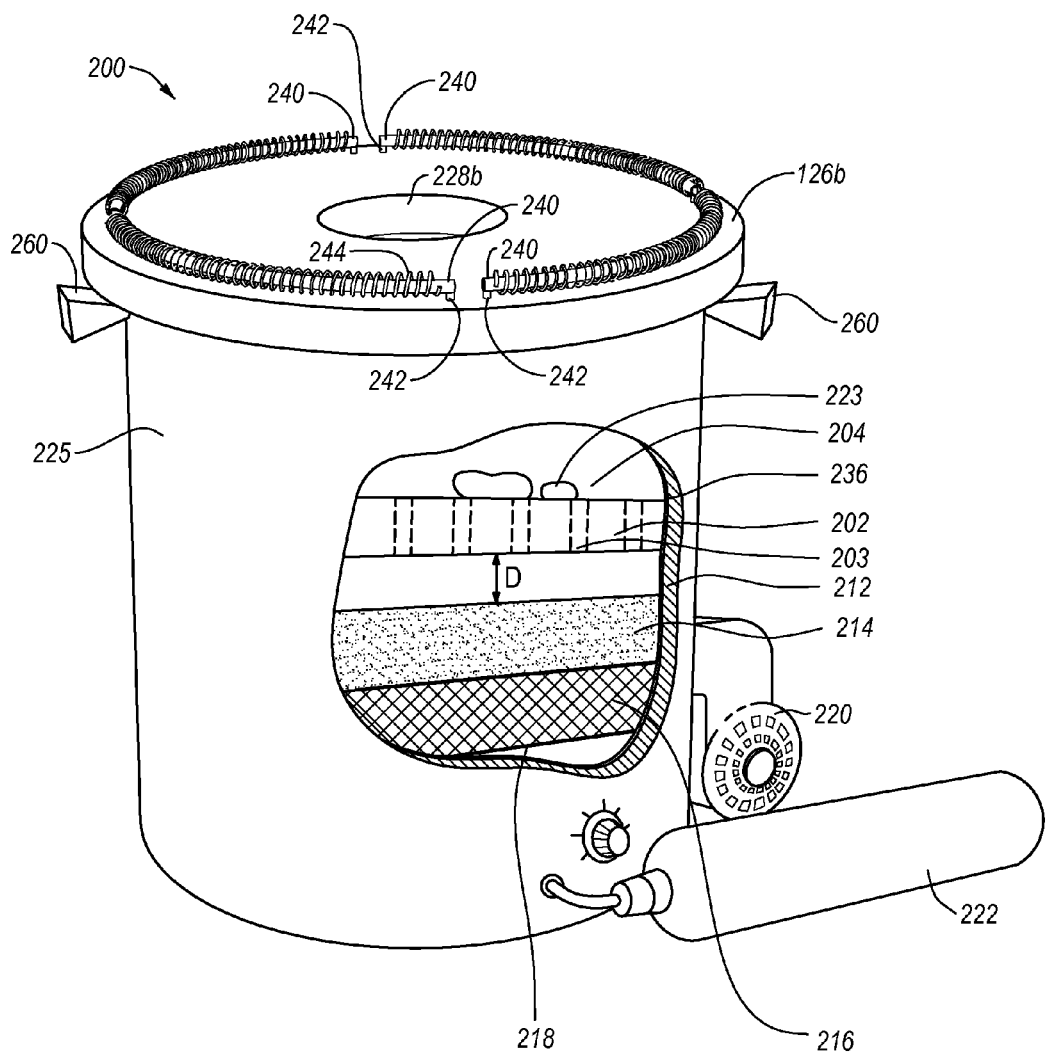
FIG. 2A is a perspective view of another embodiment of a reactor for transforming organic material into ion plasma electromagnetic energy used to produce electric power by magnet-coil generators.
Figure 2B:
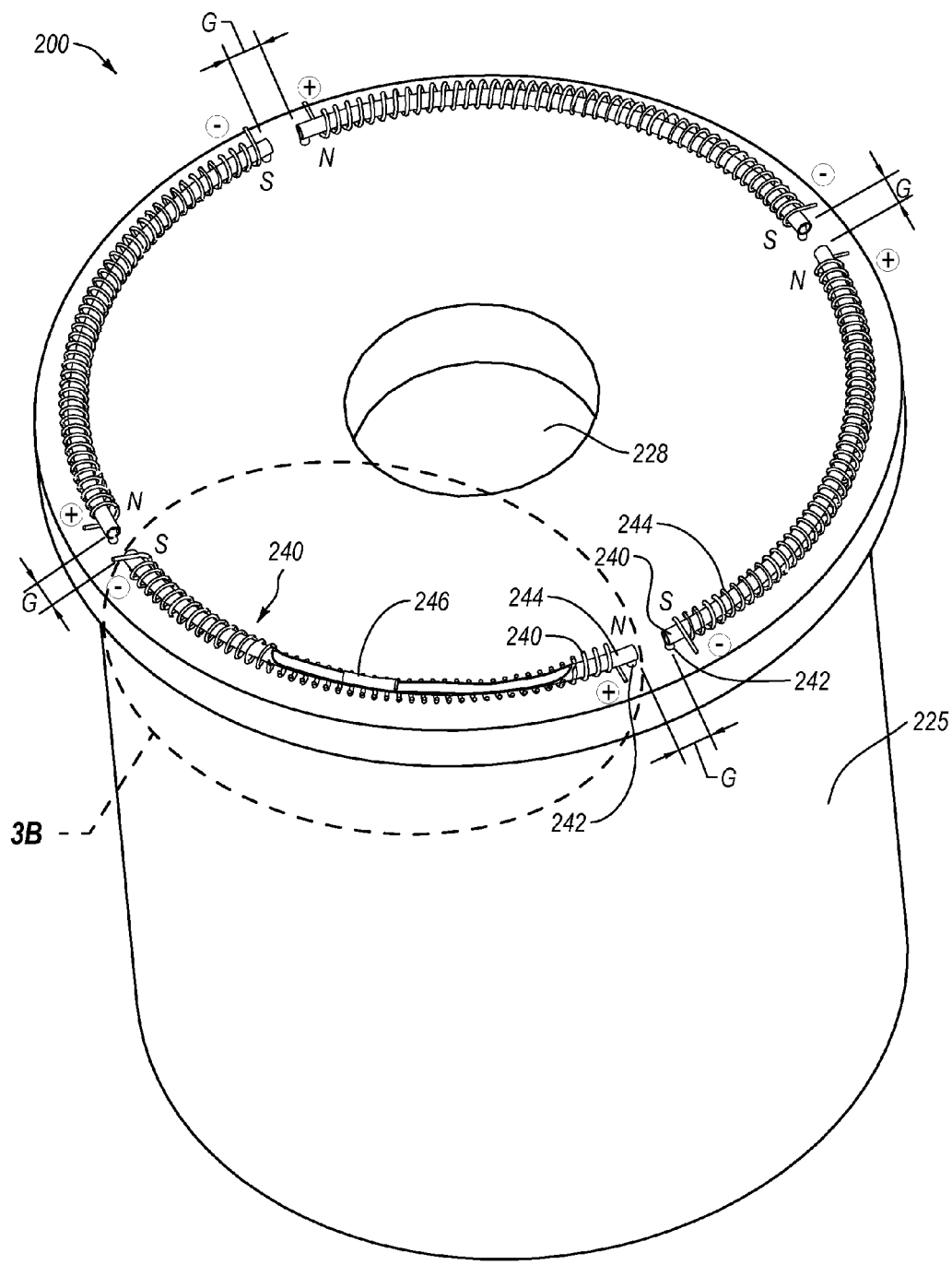
FIG. 2B is a close-up top perspective view of the reactor of FIG. 2 to more particularly show the magnet-coil generators used to convert ion plasma electromagnetic energy into electric power.
Figure 2C:
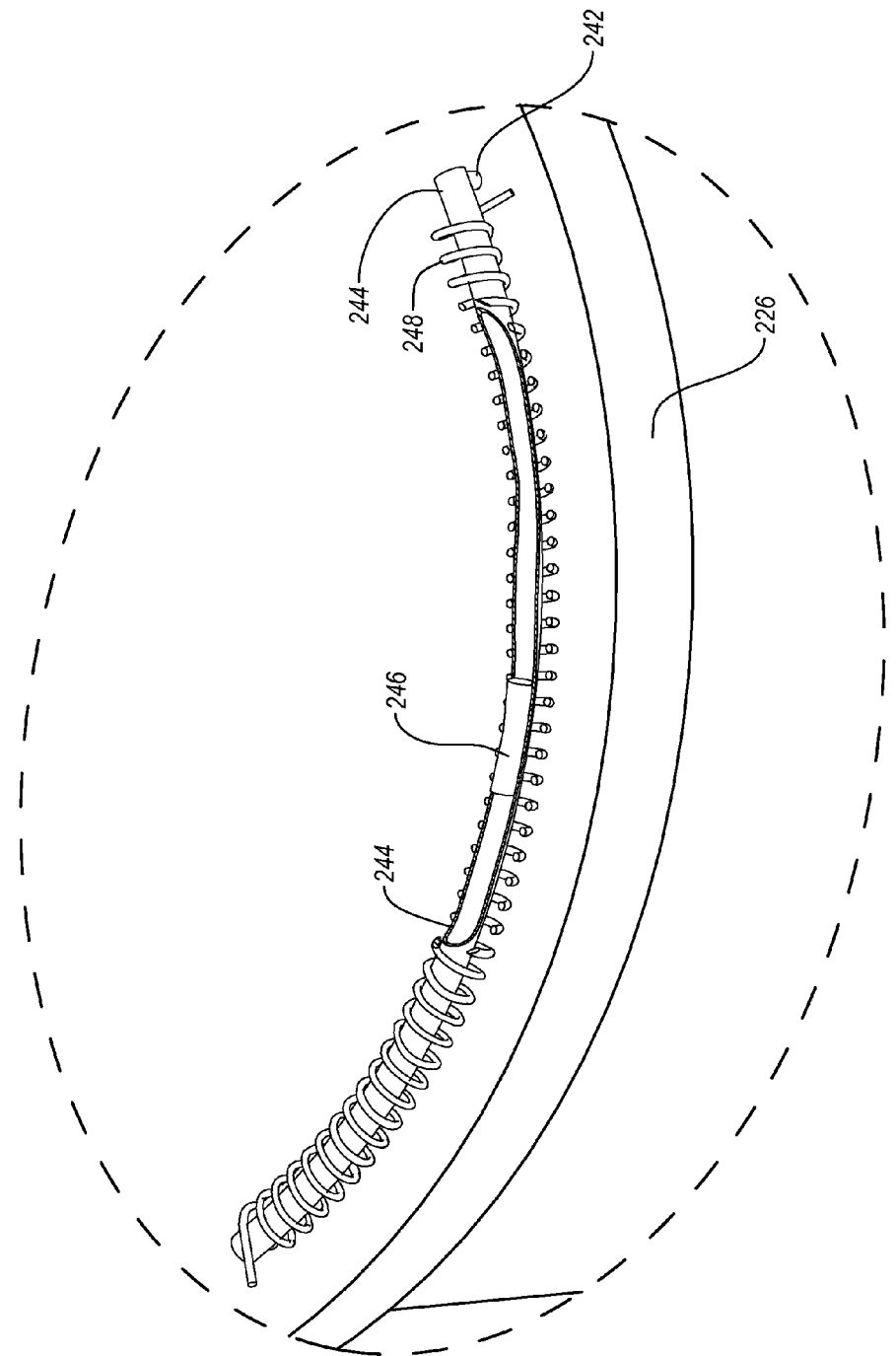
FIG. 2C is a cutaway view of a magnet-coil generator shown in FIGS. 2 and 3A.

FIGS. 2A-2C illustrate a modified version 202 of the reactor system 100 shown in FIG. 1. In this embodiment, the lid 226 is flat or substantially flat and includes an exhaust port 228. Spacers 260 can be used to hold the lid 226 in a desired spaced-apart relationship with a top surface of reactor body 225 (e.g., to permit efficient inflow of air and/or to view the glowing plasma within the reaction chamber 212). Four magnet-coil generators 240 are positioned adjacent to an above lid 226. They can be spaced apart from the lid 226 by a desired distance, such as 2-3 inches, by connectors 242.

FIGS. 2B and 2C more particularly illustrate the magnet-coil generators 240 attached adjacent to lid 226 and separated by a gap distance G. Gap distance G can be 1-4 inches or otherwise sufficient to permit independent operation of each magnet-coil generators 240 without shorting or interfering with each other. Each magnet-coil generator 240 includes an outer protective sleeve 244 (e.g., metal or plastic) covering one or more interior magnets 246. A coil 248 comprised of one or more layers of electrically conductive wire (e.g., copper or aluminum) is wrapped around the protective sleeve 244. One end of the coil 248 can act as the positive lead and the opposite end can act as the negative electrode. A volt meter (not shown) can be attached to the two ends of the coil 248 to measure the electric potential across the coil.

Figure 3A:
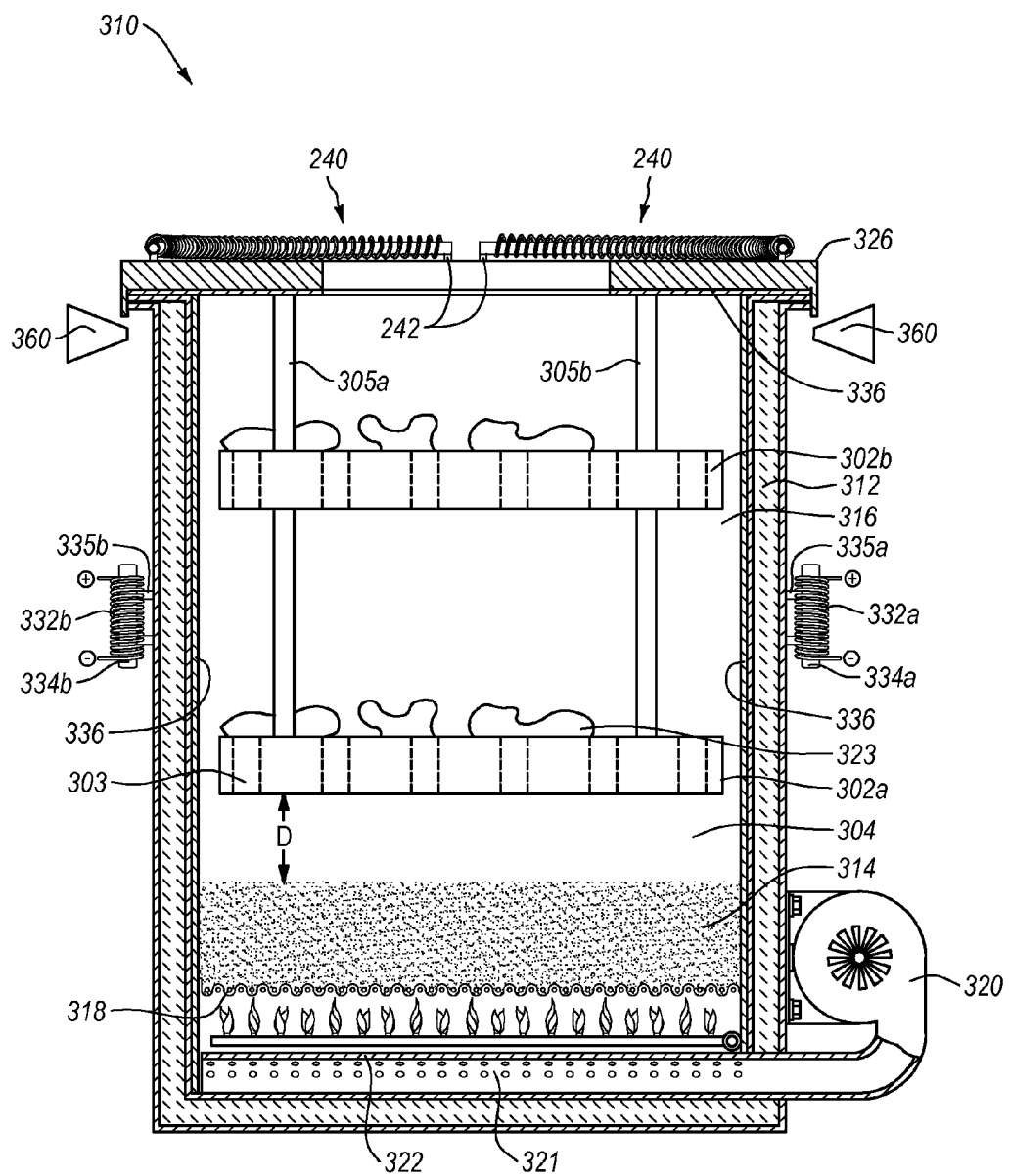
FIG. 3A is a cross-sectional view of an embodiment of a reactor for transforming organic material into ion plasma electromagnetic energy equipped with magnet-coil generators in different positions adjacent to exterior surfaces of the reactor.
Figure 3B:
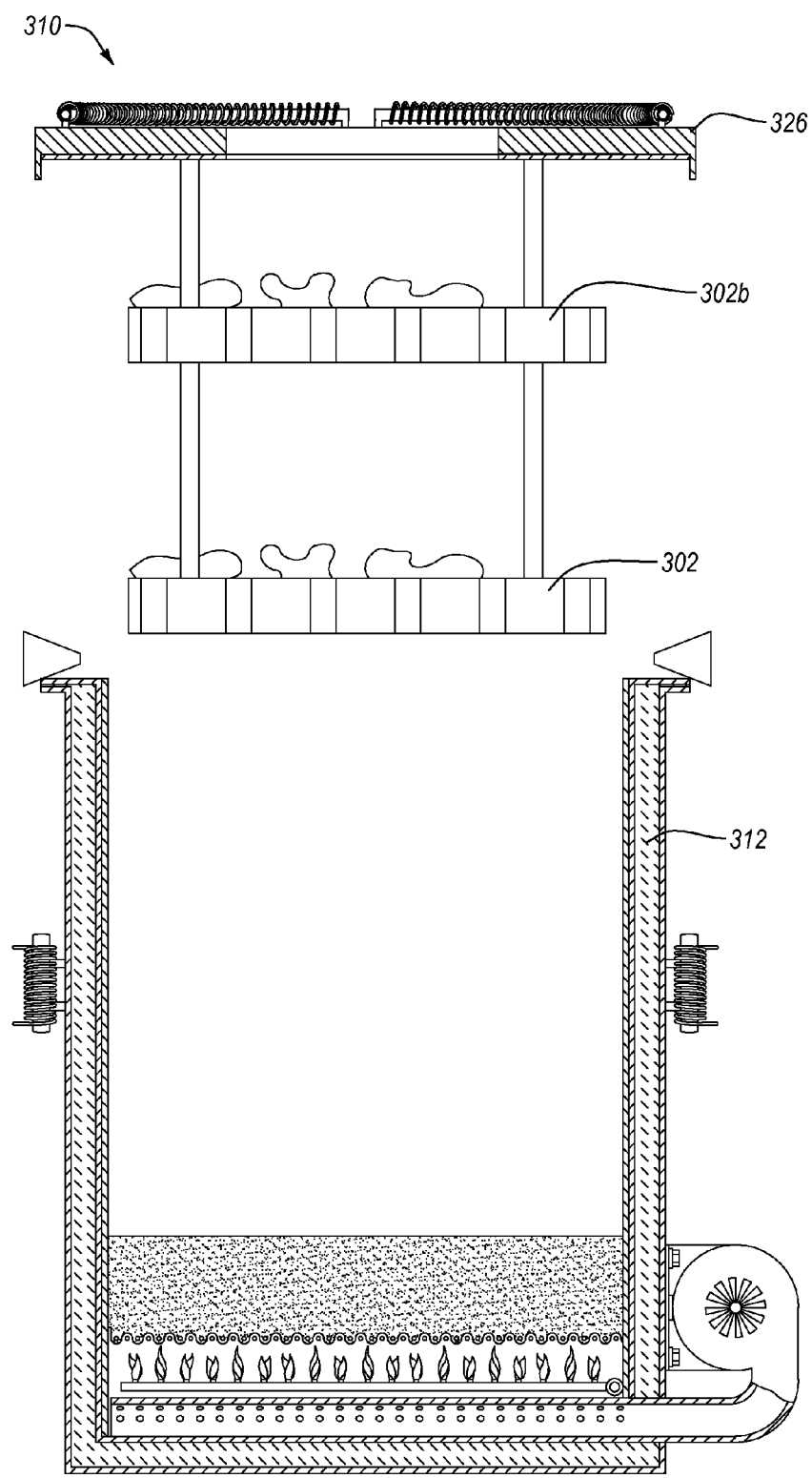
FIG. 3B is an exploded view of the reactor of FIG. 4A showing how the combined lid and organic fuel platforms can be selectively lowered into and lifted out of the interior chamber of the reactor to load with organic fuel and unload any inorganic remains.
Figure 3C:
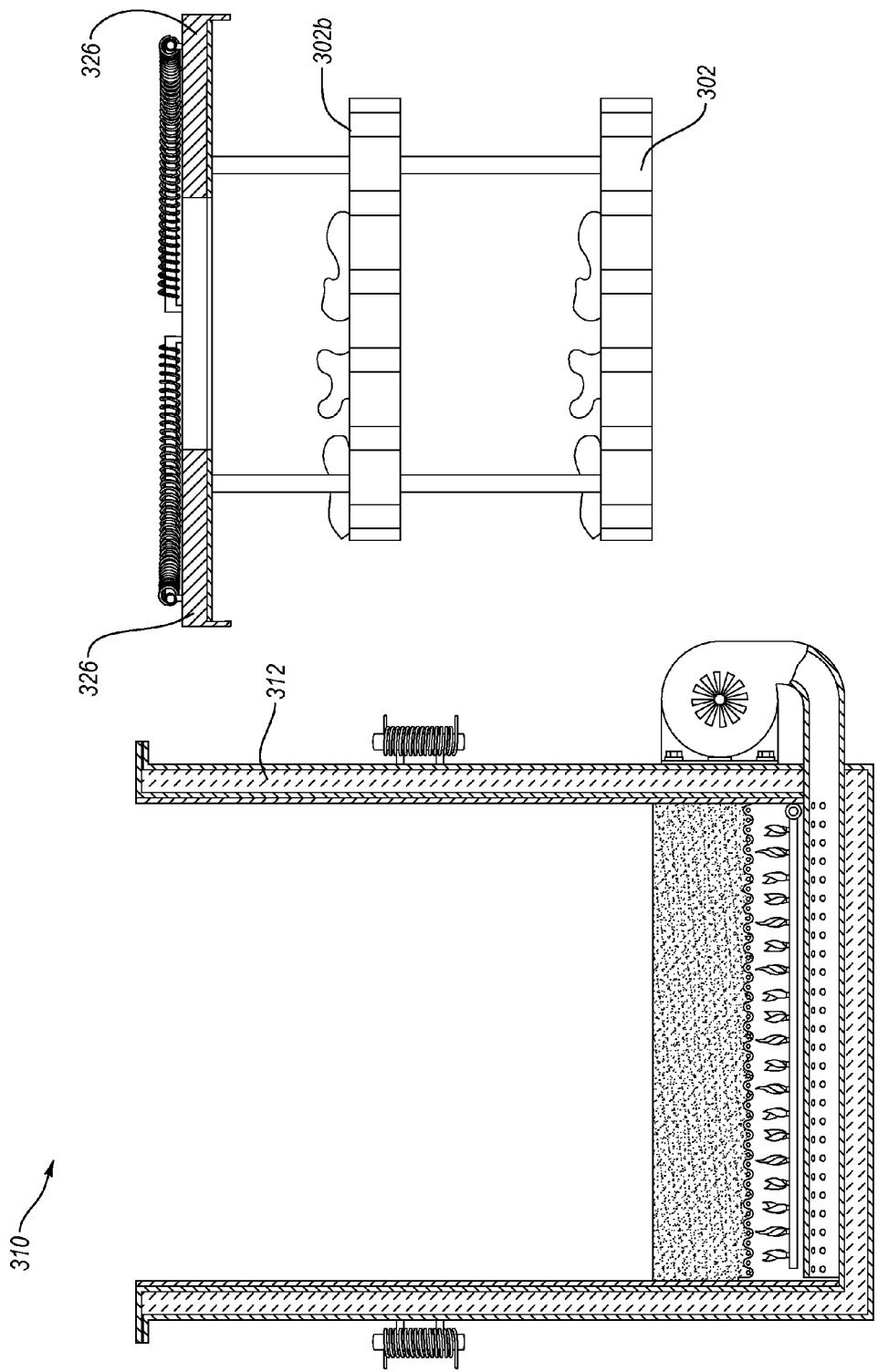
FIG. 3C is another view of the reactor of FIG. 4A with the combined lid and organic fuel platforms completely removed from the reactor for ease of loading and unloading of the platforms.

FIGS. 3A-3C illustrate another embodiment of a reactor system 310 that can be used for converting organic material 323 into thermal energy and electric power. The reactor 310 can include a reaction chamber 312 containing a heat generation source 322, an air source 320 with an air inlet 321, a base support 318 configured to diffuse airflow, a catalytic media 314, an elevated support element 302 configured to hold an organic material 323 at a distance (D) above the catalytic media 314 when in suspended condition, a Nano monomolecular film 336 on an interior surface of the reaction chamber 312, and one or more magnetic-coil generators 332a, 332b with magnetic cores 334a, 334b attached to sides of reaction chamber 312. The two magnetic-coil generators 332a, 332b are attached to the reactor 210 by fasteners 335a, 335b, such that the magnetic-coil generators 332a, 332b are in close proximity to but insulated from the reaction chamber 212. The elevated support element 302 includes one or more apertures 303 so that gases can pass therethrough and deliver reactive species to convert the organic material 323.

Suspension of catalytic media 314 within the reaction chamber 312 maintains a void space 304 between the catalytic media 314 particles and the elevated support element 302. The elevated support element 302 is configured to retain the organic material 323 above the catalytic media 314 through the various stages of conversion.

The reaction chamber 312 can include an inlet 324 so that the organic material 323, alone or already positioned on the elevated support element 302, can be introduced into the reaction chamber 312. The reaction chamber 312 can be configured with a lid 326 that can be entirely removed for loading organic materials 323 together with the support element 302 into the reaction chamber 312 (FIG. 3B). Spacers 360 can be inserted between the lid 326 and top surface of reaction chamber 312 to provide a space for more efficient gas flow in and out of the interior of reaction chamber 312. The lid 326 can also include an exhaust conduit so that gases produced by conversion of organic materials 323 can be removed. A Nano monomolecular film 336 is positioned on an interior surface of the reaction chamber 312.

Figure 4:
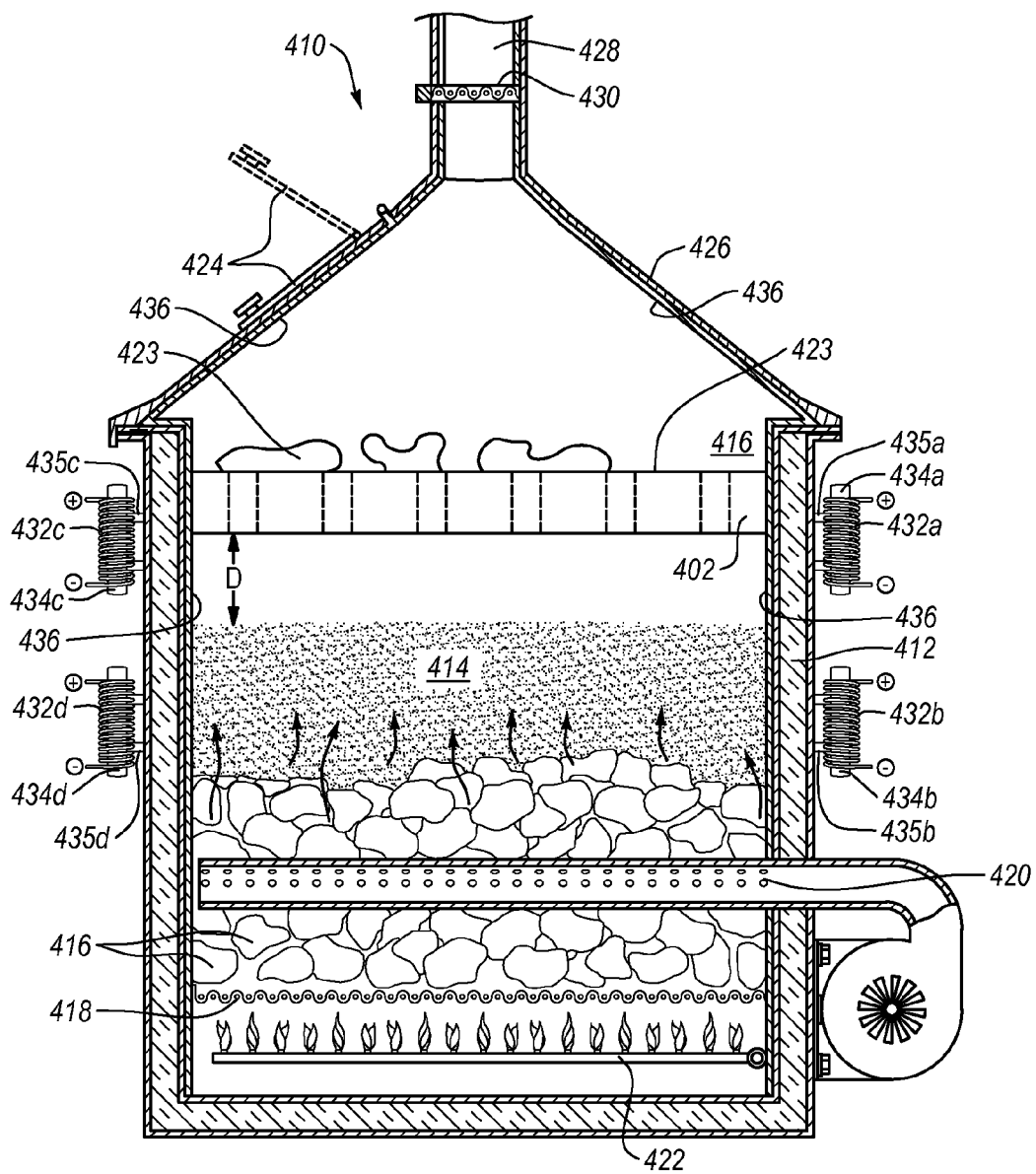
FIG. 4 is a cross-sectional view of another embodiment of a reactor for transforming organic material into electric power.

FIG. 4 illustrates another embodiment of a reactor 410 that can be used for conversion of organic materials 423 into thermal energy and electric power. The reactor 410 can include a reaction chamber 412 containing a heat generation source 422 positioned below a base support 418 holding an airflow diffuser 416, such that the heat generation source 422 can heat the base support 418 and airflow diffuser 416. An air source 420 with an air inlet 421 can be located within the airflow diffuser 416 so that the air blown into the reaction chamber 412 can be heated and diffused. A catalytic media 414 is located on or above the airflow diffuser 416 so that the diffused airflow can suspend the catalytic media 414. An elevated support element 402 configured for holding an organic material 423 is positioned within the reaction chamber 412 at a distance (D) over the catalytic media 414 when suspended. The elevated support element 402 includes one or more apertures that permit reactive gases to pass therethrough and deliver reactive species to convert the organic material 423.

The reactor 410 can also include an inlet 424 so that organic material 423 can be introduced into the reaction chamber 412 and placed on the elevated support element 402. The reaction chamber 412 can be configured with a lid 426 that can be entirely removed for loading larger size organic materials 423 as well as the elevated support element 402 into reaction chamber 412.

The reaction chamber 412 includes an exhaust conduit 428 so that exhaust gases containing reaction products and/or heat can be removed. The exhaust conduit 428 can include a filter 430 so that particulates, such as reaction product particulates, do not pass through the exhaust conduit 428, but may be retained within the reaction chamber 412 so that such particulates are fully converted within a reaction zone 416. The reaction zone 416 can be located at or around the elevated support element 402.

In one embodiment, the reaction chamber 412 can be coupled with four magnetic-coil generators 432a-d with magnetic cores 434a-d such that the conversion of the organic material 423. The power generation means includes a Nano monomolecular film 436 on an interior surface of the reaction chamber 412 and the four magnetic-coil generators 432a-d. The four magnetic-coil generators 432a-d are attached to the reactor by fasteners 435a-d, such that the magnetic-coil generators 432a-d are in close proximity to but insulated from reaction chamber 412. The number, orientation, location, or other parameter of the magnetic-coil generators 432 can be selected so that any number can be used and so that the location of the magnetic-coil generators 432 is optimum for production of electric power.

Figure 5A:
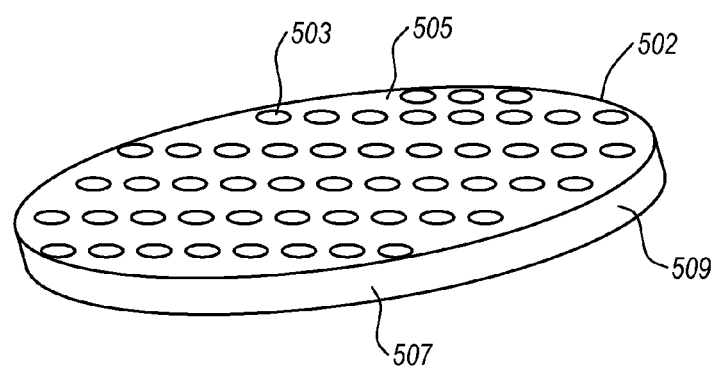
FIGS. 5A-5C include various views of support platform elements for holding and retaining organic material above the catalytic media during transformation of the organic material into ion plasma electromagnetic energy within a reactor.

FIGS. 5A-4C illustrate various embodiments of a support element 502 that can hold an organic material for conversion within a reaction chamber. As shown in FIG. 5A, the elevated support element 502 can be configured as a substrate that includes one or more apertures 503 that extend from a top surface 505 to a bottom surface so as to allow for reactive gases to pass therethrough and convert the organic material located on the top surface 505. The apertures 503 are shown up close in FIG. 5B to demonstrate that they include fluid permeable member 511.

Figure 5B:
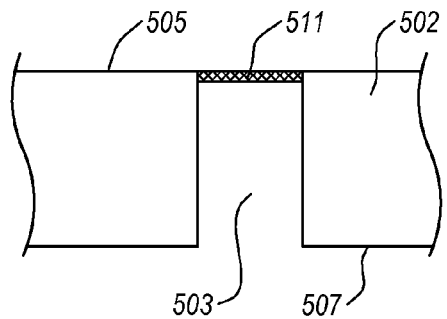
Figure 5C:
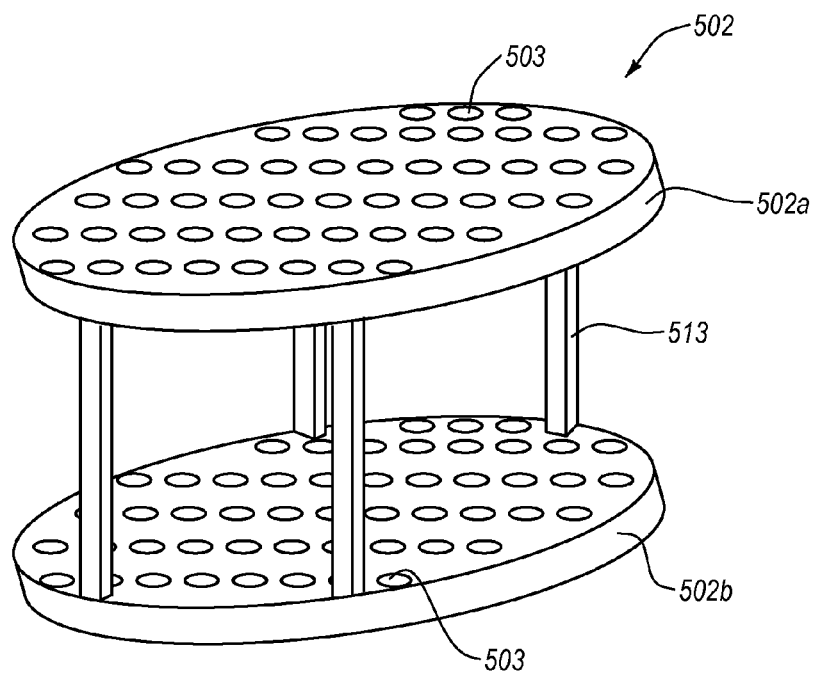

FIG. 5C shows an elevated support element 502 that has two or more elevated support substrates 502a and 502b. Each elevated support substrate 402a and 402b can be configured as any support element 402 described herein. As shown, one or more support members 513 are used to couple the two or more elevated support substrates 502a, 502b together so that the top elevated support substrate 502a is located above the bottom elevated support substrate 502b while being retained within a reaction zone. Alternatively, the two or more elevated support substrates 502a, 502b can be independently coupled with an inside wall of a reaction chamber so that support members 513 are not required. When multiple elevated support substrates 502a, 502b are included and mounted within a reaction chamber, one or more doors or access ports can be included between the elevated support substrates for access to the support substrates 502a, 502b, especially lower support substrates 502b.

In one embodiment, the elevated support element can be a distance of from about 1 inch to about 24 inches above the catalytic media when suspended, or from about 2 inches to about 12 inches, or from about 3 inches to about 8 inches, or from about 4 inches to about 5 inches. Also, these distances can be the distance from the organic material on a top surface of the elevated support element from the suspended catalytic media. Additionally, these distances can be from a bottom elevated support in a multi-elevated support embodiment. Particular examples of the distance the elevated support and/or organic material can be from 2-3 inches, more preferably from 4-5 inches, even more preferably from about 5-8 inches, and most preferably from 9-12 inches. Previously, it was thought that an organic material would have to be in physical contact with and submerged within the volume of catalytic particles in order to effect conversion or reaction of the organic materials from reactive species generated by the catalytic media. However, it has now been unexpectedly and unpredictably found that an elevated support element can be used to retain the organic material above or outside the catalytic media so that the particles of the catalytic media do not actually contact the organic material or its reaction products. Thus, now it is unexpectedly found that reactive species can be generated from the catalytic media, which then travel up to facilitate conversion of the organic material above or outside the volume of catalytic media.

While the reactors described herein can be scaled up or down depending on industrial or bench-top settings, the reaction chamber can be exemplified by a cross-sectional dimension of from about 1 foot to 10 feet, or from about 1.5 feet to about 8 feet, or from about 2 feet to about 6 feet, or from about 2.5 feet to about 5 feet, or from about 3 feet to about 4 feet. The corresponding void space or reaction chamber height for one of these cross-sectional dimensions can range from about 3 feet to about 15 feet, or from about 3.25 feet to about 10 feet, or from about 3.5 feet to about 8 feet, or from about 4 feet to about 6 feet, or about 5 feet. The reaction zone within the reaction chamber can be at or above the elevated support element or the surface containing an organic material. When multiple elevated supports are included, there may be multiple reaction zones. The height of the reaction zone can be less than about 24 inches above the elevated support, or less than about 12 inches, or less than about 8 inches, or less than about 5 inches. Particular examples of the height of the reaction zone can be about 2-3 inches around the organic material, more preferably from 4-5 inches, even more preferably from about 5-8 inches, and most preferably from 9-12 inches around the organic material. It will be appreciated that these dimensions are exemplary for a bend scale model and would certain increase when scaling up the unit (e.g. so as to have 2 to 500 times the capacity of the bend scale version).

In a one embodiment, the catalytic media particles are suspended in a fairly static condition against the force of gravity by means of air flowing upwards through the particles so that the elevated support element within the reaction chamber retains the organic material at a distance (D) above the catalytic particles. Such airflow can be provided by any gas pressurizing means known in the art, including turbines, fans, pumps, or the like. Suspending the catalytic particles greatly increases the active surface area of the silica and/or alumina particles by separating them slightly and allowing for more gas-to-particle contact for producing the reactive species that travel up to interact and convert the organic material.

The conversion of the organic material provides heat to the reaction chamber within the reaction zone such that the temperature can be maintained or even increased once gas supply to a flame source is reduced or stopped. The conversion of organic material can heat the catalytic media, void space of the reaction chamber, and the reaction zone. The temperature obtained from conversion of the organic material can increase up to about 1200° C., or maintain up to about 750° C., or up to about 600° C., or be maintained between about 400° C. to about 550° C. Higher temperatures are likely to be capable of being achieved. These temperatures can be obtained with biological materials, coal, charcoal or other fuels as the organic material. However, other carbon fuel sources may be capable of producing even more heat and higher temperatures.

Because the catalytic media is a source for reactive species that are generated from the interaction of the catalytic particles, oxygen, and the organic material, the catalytic media might be expected to break down over time, or become depleted as organic materials are converted into thermal energy. In fact, it appears that a measurable fraction of the catalytic media is broken down over time, although the amount is extremely small in comparison to the molar equivalents of organic material being converted or consumed. An advantage of the present invention is the exploitation of the highly reactive nature of the reactive species produced from the catalytic media, oxygen and the new fuel from the organic matter instead of the enormous amounts of energy that are expended in producing a sufficiently hot incinerator to combust organic materials and/or destroy the medical wastes by burning. This advantage is particularly apparent in light of the extremely low cost of catalytic media such as silica or alumina, which are readily available, largely inert until exposed to the reactive conditions, and very inexpensive.

Because of the nature of the conversion process, it is possible to greatly upscale or downscale the reactor size to accommodate a variety of uses. The reaction apparatus and chamber may be very large in order to serve large institutional needs such as a huge medical or research complex as well as industrial energy production. Conversely, it may be very small and portable when only required to destroy a small but steady stream of medical wastes or for local or personal energy production. The latter also provides for ease in moving and placement of the reactor in the most convenient location.

III. Clean Energy Production

In one embodiment, the present invention includes methods for implementing the reactor for efficiently and cleanly converting carbon-containing organic materials, such as biomass fuels and fossil fuels into electric energy. However, other organic materials, such as biological wastes and municipal waste, can also be used for clean and efficient energy production with reactors as described herein. The reactor can utilize catalytically reactive particles that are at least partially suspended by moving gases within the reaction chamber, and can be maintained at a temperature sufficient to cause the suspended media particles, typically silica sand, silica gel, or alumina, to produce reactive hydroxyl radicals, supercritical water, muon methyl radicals and/or other reactive species. The reactive species travel up into the void space above the catalytic media where they interact with the organic material supported by the elevated support element. Typically, the reaction chamber can be maintained at a temperature in a range from about 420° C. to about 550° C. Moisture may be provided by the organic mass.

Clean energy production includes means for converting energy into useable energy such as heat and electricity. Electrical power is generated through the interaction between ion plasma electromagnetic energy generated by the reactor and one or more magnetic-coil generators positioned outside of and adjacent to the reactor.

IV. Examples

Example 1

A reactor substantially as described herein was used in experiments to convert and degrade organic materials ranging from cow bones, flesh, and PVC plastics in order to mimic other biological or medical wastes. It was found, surprisingly and unexpectedly, that the organic material does not have to physically contact the catalytic media as was previously believed. It has now been surprisingly and unexpectedly found that conversion and degradation of organic materials can be achieved by positioning the organic material above the catalytic media such that the organic material does not actually contact, and is not submerged within the volume of, the catalytic media. The organic materials in this example were not submerged into the silica bed but were rather positioned above the silica, suspended in a metal cage container. The conversion reaction with the biological material appears to occur in about a 2-36 inch zone above the silica bed. The conversion reaction not only broke down the organic matter, it also converted the low energy grade materials (e.g., bones, plastic and biological waste materials) into a substantially higher amount of energy than would be expected by mere incineration as found by observing temperature increases in the reaction zone and void space above the catalytic media.

The conversion and energy production from biological waste materials were conducted by introducing about 5 lbs of organic matter (e.g., bones, flesh, and/or plastics) into a permeable container and then lowering the container into the reaction chamber, with a lid placed over the top of the reactor. Prior to placing the organic material into the reaction chamber, air was injected from the bottom, which passes through the silica, suspending the media. Natural gas was injected into the silica media and ignited. The natural gas was used to heat the chamber to a temperature of 540° C. That temperature was reached in approximately 20 seconds then the system automatically turned off the supply of gas. Airflow was continuously injected into the reaction chamber as a continuous flow of ambient temperature air through the system.

At this point, the organic material was introduced into the chamber via a container cage (e.g., support element) which was lowered into the chamber and a lid was placed on top. The temperature of the reaction chamber, as measured inside the silica bed, continued to climb to approximately 870° C. as a result of the plasma reaction. In general, the temperature can stay between 540° C. and 920° C. for up to 40 minutes after the gas to the flame source is turned off, though the temperature is regulated to maintain an optimal 870° C. The temperature is maintained with a continuous stream of cool, ambient air injected through the bottom of the reaction chamber to maintain suspension of the catalytic media.

Example 2

During conversion of organic waste materials, it was realized that a significant amount of energy was being produced due to the increase and maintenance of elevated temperatures. Accordingly, an experiment was conducted to determine whether energy could be produced from higher grade solid fuels in, such as coal or charcoal. It was hypothesized that the process can enhance the release of energy in coal or other carbon fuel sources and obtain more consistent and higher sustained temperatures.

First, a baseline experiment was conducted to determine how fast the temperature would rise and fall when the system is only injected with natural gas as the heating element. This experiment showed that with gas only, the systems temperature rose to 406° C., and without gas turned on, but with air blowing through, cooled to 350° C. within 2 minutes, 13 seconds.

Second, about 1½ lbs of charcoal were introduced into the reaction chamber using an elevated support. The system ran 20 minutes at 506° C.

Third, ½ lbs of charcoal were introduced into the reaction chamber onto the elevated support, and temperature measurements in the reaction zone were taken every minute.

The foregoing experiment only used ½ lb of charcoal and the system maintained a fairly consistent temperature range for the first 8 minutes. However, it is believed that the silica bed began to get clumped up, which sometimes occurs and underlines the importance of airflow diffusion and sufficient suspension of the catalytic media without the media clumping. When media clumping occurs, the uneven flow of air seems to slow down the conversion reaction and possible the generation of reactive species from the catalytic media. At minute 17, the system cooled down to the point that it started automatically injecting gas, but temperature continued to drop because of the uneven air flow. Then at minute 21, the airflow pressure was increased and this restored the silica and air flow. About 2 minutes later the gas went off, and there was another 8 minutes of sustained high temperature, which was even better than the first part of the experiment, until the all the material was depleted and the experiment was stopped.

From the foregoing, it can be determined that a very small amount of organic material can maintain and even obtain a high temperature for a significant amount of time. It can also be determined that since the reaction chamber is continuously being injected with cold air, the organic material can sustain complete combustion, which further highlights the consistency of the organic material maintaining a high temperature. The baseline test shows that the air will rapidly cool the system from 406° C. to 350° C. in 2 minutes because of the temperature of the air injected. Additionally, a proper flow of air through the silica bed appears to be important for maintaining the conversion reaction and high temperature. When the airflow is disrupted, the conversion reaction appears to lessen and the temperature goes down, but much slower than the base line, which suggests that partial flow provides a partial conversion reaction. Furthermore, it is thought that recirculation of exhaust gases or introducing hot air into the system may significantly increase the temperature and energy production because it will eliminate the cooling effect of cold air. Moreover, the conversion reaction occurs above the silica bed such that the silica bed can now be reused without cleaning and removing remains of the organic material. Thereafter, the elevated support can be cleaned and/or removed to remove the remains of the organic material.

The pyroelectric-electromagnetic generator transfer electrons between the pyroelectric materials on the reaction chamber to the solenoids and generate electrical power estimated to be 1000 to 50,000 KW.

It is thought that through the airflow having hydroxyl radicals, supercritical water, muons and/or other reactive species can interact with the organic material in order to combust or otherwise react with the organic matter, and thereby convert the organic materials into high amount of thermal energy.

The presently described systems and methods can be used for a low carbon dioxide output process for producing electricity. Such a system and method can use a fraction of the volume of carbon fuel (e.g., coal) to obtain an equal amount of energy. Moreover, the presently described systems and methods can be useful for converting low grade fuel, trash, organic materials, or the like into high grade clean energy.

Example 3

15 lbs of Appalachian hard coal was tested in the center level of the invention. Once the 540° C. temperature was reached, the gas was shut off and the coal introduced into the device. The process ran for 90 minutes and maintained a temperature of 540° C. to 570° C. without the natural gas. At the end of the experiment, the weight of the coal had been reduced from 10 lbs to 1 lb 8 oz and substantial amounts of electrons and energy had been released with virtually no ash or emissions. The remaining material was whole and unbroken as though the new super fuel was siphoned from the coal chunk, with the remaining material left whole and undamaged, and transformed out of coal into inert and inflammable matter with the same structure.

Example 4

Following the foregoing experiments, four magnetic-coil generators were positioned various distances from 1-5 inches outside the lid of the reactor. The best electric power generation was produced at 5-8 inches away from the lid. The existence of electric power generation was confirmed by use of a volt meter, which indicated an electric potential of 6-8 millivolts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

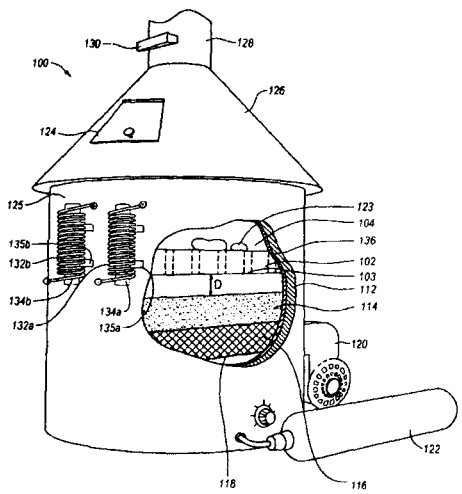

What is claimed is:

1. A reactor system for transforming organic material into a fuel and then converting the fuel into thermal and electric energy, with high temperatures exceeding 1200° C. and whirling electrons, comprising:
    a Nano monomolecular film deposited on an interior surface of a reaction chamber, wherein a Nano is an elongated precise sized particle in which adjacent particles are magnetically locked one to the other and are precisely aligned to form the monomolecular film;
    a bed of catalytic media located above a natural gas ignition chamber within the reaction chamber comprised of a material that generates OH (hydroxyl) radicals in the presence of heat and joined by Muon methyl radical or OHHO to efficiently break chemical bonds from all organic matter including fuel positioned in the reaction chamber to transform organic waste or other organic material into heat, whirling electrons and electric energy;

a heat source in communication with the reaction chamber for initiating a reaction between hydroxyl radical and Muon methyl radical or OHHO and the organic material for conversion of the organic material into whirling electrons and thermal energy;

an air source used to pressurize the system and pressurize from the bottom of a plasma within the reaction chamber and maintain desired conditions within the reaction chamber;

a support structure positionable within the reaction chamber, including one or more apertures that fluidly couple a top surface with a bottom surface, and being configured to hold and retain organic material adjacent to the catalytic media and form plasma during transformation into thermal energy and produce whirling electrons; and one or more magnetic-coils for collecting electrons positioned outside of and adjacent to the reaction chamber, the one or more magnetic-coils including a magnetic core and a coil wrapped around the magnet core and being configured to conduct electrons to a capacitor and electricity from the capacitor during transformation of the organic material within the reactor.

2. The reactor system of claim 1, wherein the Nano monomolecular film has four magnetic regions that lock adjoining particles in precise alignment and comprises a single layer of interlocked nano particles consisting of aligned carbon sized molecule having dimensions of 30 angstroms by 50 angstroms that are elongated to 70 angstroms at high pressure, wherein the Nano monomolecular film enhances formation of hydroxyl radicals, Muon methyl radicals or OHHO and/or other reactive species within the reaction chamber in intervals of 2.2 milliseconds that break molecular bonds to separate 17 inorganic elements, forming supercritical water as a gas as the single emission.

3. The reactor system of claim 2, wherein the reactive species transform the fuel into thermal energy, eliminates formation of carbon monoxide (CO) and removes 17 inorganic elements from the organic material place in the reaction chamber.

4. The reactor system of claim 3, wherein the organic material is derived from coal which is transformed into super fuel that is removed from inorganic coal matter in the coal without emitting into the atmosphere ash or standard coal emissions.

5. The reactor of claim 1, wherein the heat source is a natural gas burner, the Nano monomolecular film, OH radicals and Muon methyl radicals released from the catalytic media transforming the natural gas into a new fuel within 20 seconds of ignition that raises the combustion temperature to 540° C. and initiates the ion plasma reaction once the organic material is introduced into the reaction chamber.

6. The reactor system of claim 1, wherein the Nano monomolecular film is caused to interact with released Muon methyl radicals and hydroxyl radicals and new fuel materials produced during conversion of organic natural gas to cold start within the reactor to produce an ion plasma within the reactor that generates an electromagnetic field.

7. The reactor system of claim 6, wherein the one or more magnetic-coils attract and collect free electrons generated within the electromagnetic field generated by the Nano monomoleclor film that interact with the ion plasma that produces 540° C. within 20 seconds of a cold start generated within the reactor in order to produce electrons.

8. The reactor system of claim 1, further comprising electrical wires connected to the one or more magnetic-coils to conduct electricity to an electricity grid for distribution and/or to a capacitor for transfer to a battery or other electrical storage device.

9. The reactor system of claim 1, further comprising a thermal heat exchange system positioned within the reaction chamber configured to transfer thermal energy produced within the reaction chamber to an electrical generation unit.

10. The reactor system of claim 1, further comprising a cover positioned over an opening through the top of the reaction chamber and that is configured to be selectively raised and lowered in order to control conversion reactions involving organic material within the reaction chamber.

11. The reactor system of claim 1, wherein the one or more magnetic-coils are positioned on a surface of a lid that selectively covers and uncovers the reaction chamber.

12. The reactor system of claim 1, wherein the one or more one or more magnetic-coils have a generating capacity of at least 5 megawatts.

13. The reactor system of claim 1, wherein the support structure is maintained a distance of from about 1 inch to about 24 inches above the catalytic media when suspended.

14. The reactor system of claim 1, wherein the catalytic media includes a bed of particles selected from the group consisting of silica sand, silica gel, hydroxylbastnasite, alumina, and combinations thereof and is selected to produce reactive species when exposed to heated atmosphere within the reaction chamber.

15. A reactor system for transforming organic material into a fuel and then converting the fuel into thermal and electric energy, comprising:

a Nano monomolecular film deposited on an interior surface of a reaction chamber, wherein the monomolecular film includes adjacent particles magnetically locked one to another and aligned to form the monomolecular film;

a bed of catalytic media located within the reaction chamber and comprised of a material that generates OH (hydroxyl) radicals in the presence of heat to break chemical bonds and transform organic material into heat, whirling electrons and electric energy;

a heat source in communication with the reaction chamber for initiating a reaction between hydroxyl radicals and the organic material for conversion of the organic material into whirling electrons and thermal energy;

an air source used to provide air flow within the reaction chamber and maintain desired conditions within the reaction chamber;

a support structure positionable within the reaction chamber and configured to hold organic material adjacent to the catalytic media and form plasma during transformation into thermal energy and produce whirling electrons; and one or more magnetic-coils for collecting electrons positioned outside of and adjacent to the reaction chamber, the one or more magnetic-coils including a magnetic core and a coil wrapped around the magnet core and being configured to conduct electrons during transformation of the organic material within the reactor.

* * * * *

UNITED STATES PATENT AND TRADEMARK OFFICE
CERTIFICATE OF CORRECTION

| | | |
|---|---|---|
| PATENT NO. | : 8,512,644 B1 | Page 1 of 8 |
| APPLICATION NO. | : 13/564543 | |
| DATED | : August 20, 2013 | |
| INVENTOR(S) | : Maganas | |

It is certified that error appears in the above-identified patent and that said Letters Patent is hereby corrected as shown below:

Title Page, illustrative fig. 1 should be deleted and substitute therefor the attached title page consisting of illustrative fig. 1.

Drawings

Figs. 1, 2A, 3A, 3B, 3C, 4 and 5 should be deleted and substitute therefor the attached figs. 1, 2A, 3A-3C, 4-5 as shown on the attached pages.

Sheet 1, replace Figure 1 with the figure depicted below, wherein one of the lead lines from label 124 is erased

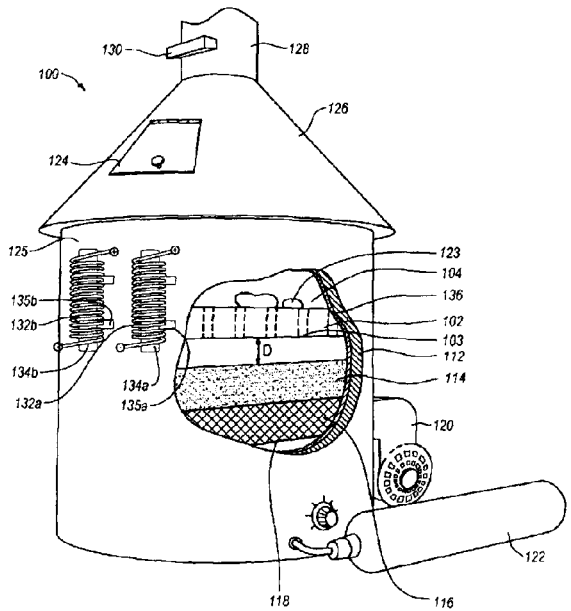

Fig. 1

Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 8,512,644 B1

Sheet 2, replace Figure 2A with the figure depicted below, wherein the labels 228b and 126b are modified to say 228 and 226, respectively

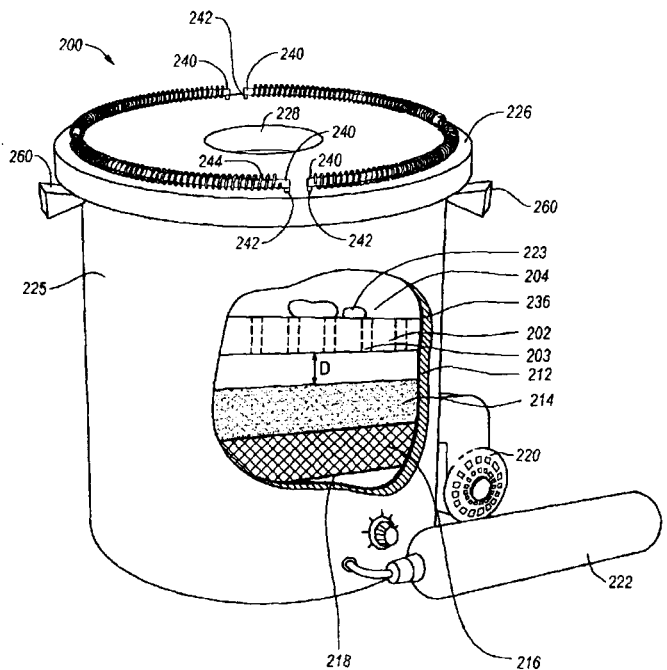

Fig. 2A

Sheet 5, replace Figure 3A with the figure depicted below, wherein the label 310 is modified to 300 and labels 305a, 305b, and 316 are omitted from the drawing

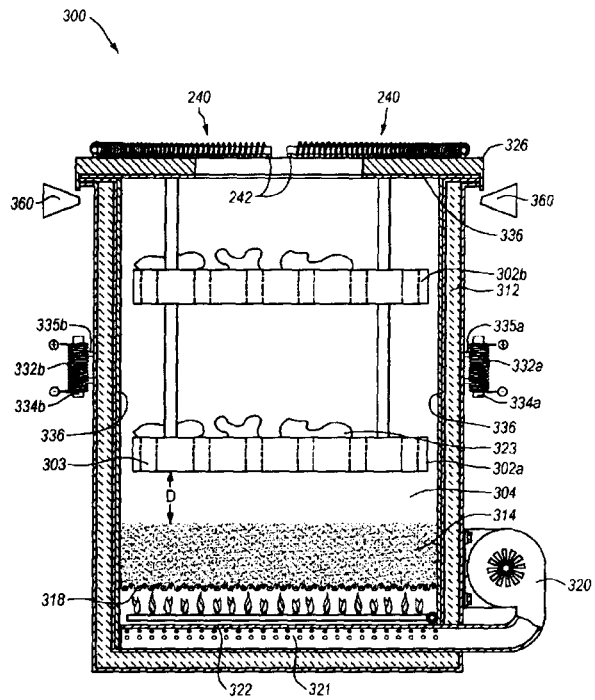

Fig. 3A

Sheet 6, replace Figure 3B with the figure depicted below, wherein the labels 310 and 302 are modified to say 300 and 302a, respectively Sheet 7, replace Figure 3C with the figure depicted below, wherein the labels 310 and 302 are modified to say 300 and 302a, respectively

CERTIFICATE OF CORRECTION (continued)
U.S. Pat. No. 8,512,644 B1

Sheet 8, replace Figure 4 with the figure depicted below, wherein the labels 410, 416, and 420 are modified to say 400, 410, and 421, respectively, and the label 420 is added to the drawing

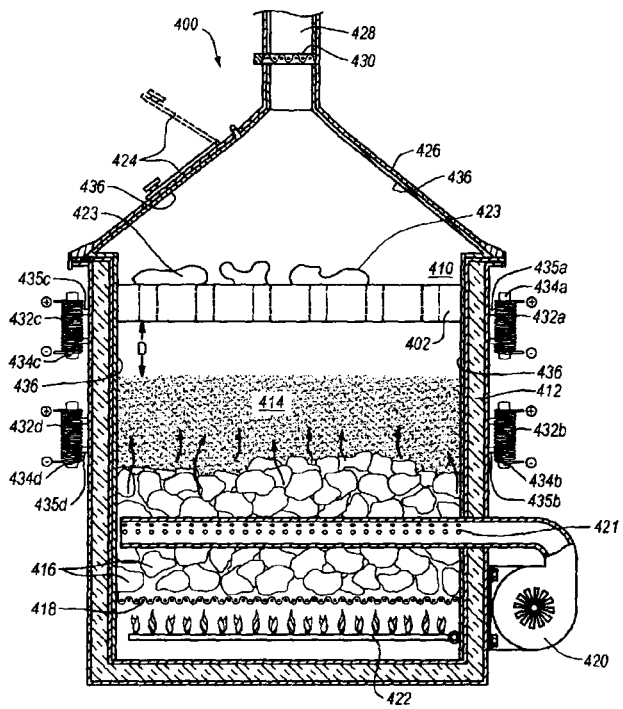

*Fig. 4*

Sheet 9, replace Figure 5A with the figure depicted below, wherein the label 509 is omitted from the drawing

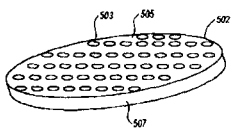

*Fig. 5A*

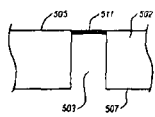

*Fig. 5B*

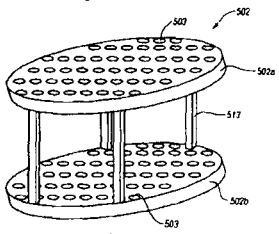

*Fig. 5C*

CERTIFICATE OF CORRECTION (continued)
U.S. Pat. No. 8,512,644 B1

In the Specification

Column 1
Line 17, change "near" to --nearly--
Line 43, change "transforms converts them" to --transforms or converts them--
Line 59, change "Muon methyl radical" to --muon methyl radicals--
Line 61, change "that destroy formation" to --that destroy the formation--
Line 63, change "atmospheric emission" to --atmospheric emissions--

Column 2
Line 1, change "produced by electromagnetic field" to --produced by an electromagnetic field--
Line 15, change "produce electromagnetic field" to --produce an electromagnetic field--
Line 25, change "which then converted" to --which is then converted--
Line 35, change "Muon methyl radicals" to --muon methyl radicals--
Line 44, change "OH radicals and muons," to --OH radicals, muons,--
Line 53, change "minutes then increases" to --minutes and then increases--
Line 66, change "typically leaving" to --typically leaves--

Column 3
Line 4, change "having alternating" to --have alternating--
Line 39, change "FIG. 2" to --FIG. 2A--
Line 42, change "view of a magnet-coil" to --view of the magnet-coil--
Line 43, change "FIGS. 2 and 3A" to --FIGS. 2A and 3A--
Line 49, change "FIG. 4A" to --FIG. 3A--
Line 54, change "FIG. 4A" to --FIG. 3A--

Column 4
Line 23, change "reaches 680°+ C. plus" to --reached 680°+C.--
Line 36, change "below center" to --below the center--
Line 43, change "Maganas.com" to --Maganas.com,--
Line 44, change "show that the electrons" to --shows that the electrons--
Line 55, change "Muon methyl radicles" to --muon methyl radicals--
Line 56, change "mille seconds" to --milliseconds--
Line 58, change "Super critical water" to --Supercritical water--
Line 62, change "super fuel producing precisely weighed" to --super fuel precisely weighed--

Column 5
Line 15, change "transform, friction, and to expand" to --transformation, friction, and expansion of--
Line 16, change "space and is ready" to --space, and is ready--
Line 17, change "surface and withstand temperatures" to --surface and can withstand temperatures--
Lines 39 and 40, change "3/16 stainless steel machine table top that demonstrates" to --3/16 of an inch stainless steel machine tabletop that demonstrated--
Line 48, change "Muon methyl radicals" to --muon methyl radicals--
Line 49, change "mille seconds" to --milliseconds--

Column 6
Line 21, change "nanofilm" to --nano film--
Line 54, change "generate and/or release energy" to --generates and/or releases energy--
Line 65, change "result in formation of" to --result in the formation of--

Column 7
Line 50, change "weight loose" to --weight loss--

Column 9
Line 10, change "Maganas Plasma transformation" to --Maganas' plasma transformation--
Line 39, change "include" to --includes--
Line 48, change "catalytic media" to --catalytic media 114--

Column 10
Line 57, change "catalytic media" to --catalytic media 114--

Column 11
Line 11, change "base support" to --base support 118--
Line 19, change "to a partially suspend" to --to partially suspend--

Column 12
Line 58, change "combusting and destruction" to --combustion and destruction--

Column 13
Line 9, change "generators 132" to --generators 132a and 132b--
Line 11, change "generator 132 includes a magnetic core 134" to --generators 132a and 132b include magnetic cores 134a and 134b--
Line 15, change "generator 132 interacts" to --generators 132a and 132b interact--
Line 49, change "heat generation source 120 and/or air source 122" to --heat generation source 122 and/or air source 120--
Line 50, change "heat generation source 120" to --heat generation source 122--
Line 52, change "air source 122" to --air source 120--
Line 56, change "heat generation source 120" to --heat generation source 122--

Column 14
Line 8, change "version 202" to --version 200--
Line 33, change "reactor system 310" to --reactor system 300--
Line 34, change "reactor 310" to --reactor 300--
Line 38, change "support element 302" to --support elements 302a and 302b--
Line 45, change "reactor 210" to --reactor 300--

Column 15
Line 4, change "reactor 410" to --reactor 400--
Line 6, change "reactor 410" to --reactor 400--
Line 23, change "reactor 410" to --reactor 400--
Line 36, change "reaction zone 416" to --reaction zone 410--
Line 37, change "reaction zone 416" to --reaction zone 410--
Line 41, change "such that the conversion" to --for the conversion--
Line 49, change "generators 432" to --generators 432*a-d*--
Line 51, change "generators 432" to --generators 432*a-d*--
Line 58, change "bottom surface" to --bottom surface 507--
Line 65, change "substrate 402*a* and 402*b*" to --substrates 502*a* and 502*b*--
Line 66, change "support element 402" to --support element 502--

Column 16
Line 12, change "substrates 502*b*" to --substrate 502*b*--
Line 62, change "certain increase" to --certainly increase--

Column 19
Line 10, change "higher grade solid fuels in" to --higher grade, solid fuels--
Line 18, change "systems temperature" to --system's temperature--
Line 26, change "1/2 lbs of charcoal" to --1/2 lb of charcoal--

Column 20
Line 22, change "hard coal was tested" to --hard coal were tested--

Column 21
Line 36, change "separate 17 inorganic elements" to --separate 17 inorganic elements--

CERTIFICATE OF CORRECTION (continued)

(12) United States Patent
Maganas

(10) Patent No.: US 8,512,644 B1
(45) Date of Patent: *Aug. 20, 2013

(54) SYSTEM FOR TRANSFORMING ORGANIC WASTE MATERIALS INTO THERMAL ENERGY AND ELECTRIC POWER

(76) Inventor: Thomas C. Maganas, Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,543

(22) Filed: Aug. 1, 2012

(51) Int. Cl.
*B01J 8/00* (2006.01)

(52) U.S. Cl.
USPC ............ 422/186; 422/140; 422/146; 588/313

(58) Field of Classification Search
CPC ........................................................ B01J 8/00
USPC .................... 422/140, 146, 186; 588/313
See application file for complete search history.

(56) References Cited

U.S. PATENT DOCUMENTS

| | | |
|---|---|---|
| 2,956,865 A | 10/1960 | Williams, Sr. |
| 3,632,304 A | 1/1972 | Hardison |
| 3,714,071 A | 1/1973 | Michalko |
| 3,841,242 A | 10/1974 | Sigg |
| 3,915,890 A | 10/1975 | Soldate |
| 3,922,975 A | 12/1975 | Reese |
| 4,052,173 A | 10/1977 | Schultz |
| 4,308,806 A | 1/1982 | Uemura et al. |
| 4,330,513 A | 5/1982 | Hunter et al. |
| 4,497,637 A | 2/1985 | Purdy et al. |
| 4,623,400 A | 11/1986 | Japka et al. |
| 4,701,312 A | 10/1987 | Kice |
| 4,708,067 A | 11/1987 | Narisoko et al. |
| 4,724,776 A | 2/1988 | Foresto |
| 4,761,270 A | 8/1988 | Turchan |
| 4,886,001 A | 12/1989 | Chang et al. |
| 4,974,531 A | 12/1990 | Korenberg |
| 4,977,840 A | 12/1990 | Summers |
| 4,991,521 A | 2/1991 | Green et al. |
| 5,010,830 A | 4/1991 | Asuka et al. |
| 5,178,101 A | 1/1993 | Bell |
| 5,181,795 A | 1/1993 | Circeo, Jr. et al. |
| 5,207,734 A | 5/1993 | Day et al. |

(Continued)

FOREIGN PATENT DOCUMENTS

| | | |
|---|---|---|
| EP | 0176123 | 4/1986 |
| EP | 0605719 | 7/1994 |

(Continued)

OTHER PUBLICATIONS

Biozone Scientific, Hydroxyls: Powerful air Purification, www.extrapureair.com, pp. 1-3 (Jun. 19, 2002).

(Continued)

*Primary Examiner* — Nina Bhat
(74) *Attorney, Agent, or Firm* — Workman Nydegger

(57) ABSTRACT

A power generation system for converting organic material into thermal energy and electric power. A reaction of organic material with supercritical water, —OH radicals, and muon methyl radicals are released from a catalytic bed of silica particles in suspended initially transform the organic material into thermal energy. A Nano monomolecular film located on an interior surface of the reaction chamber interacts with plasma formed by conversion of the organic material into thermal energy to produce ion plasma electromagnetic energy. One or more magnetic-coil generators positioned adjacent to the reaction chamber interacts with the electromagnetic energy to produce electric power.

15 Claims, 10 Drawing Sheets